(12) United States Patent
Sorensen et al.

(10) Patent No.: US 6,925,770 B2
(45) Date of Patent: Aug. 9, 2005

(54) INTERLOCKABLE ELEMENT FOR STRUCTURE ASSEMBLY SET

(75) Inventors: Jens Ole Sorensen, Grand Cayman (KY); Paul Philip Brown, Ramona, CA (US)

(73) Assignee: Sorensen Research and Development Trust, San Diego, CA (US)

( * ) Notice: Subject to any disclaimer, the term of this patent is extended or adjusted under 35 U.S.C. 154(b) by 119 days.

(21) Appl. No.: 10/741,045

(22) Filed: Dec. 19, 2003

(65) Prior Publication Data

US 2004/0128935 A1 Jul. 8, 2004

Related U.S. Application Data

(62) Division of application No. 10/139,874, filed on May 7, 2002, now Pat. No. 6,665,993.

(51) Int. Cl.$^7$ ................................................. E04B 2/08
(52) U.S. Cl. ..................... 52/591.2; 446/120; 446/116; 446/104; 403/119; 428/33
(58) Field of Search ............................ 52/591.2, 591.1, 52/70.71; 446/120, 116, 104; 403/119; 428/33; 40/733, 796

(56) References Cited

U.S. PATENT DOCUMENTS

| | | | |
|---|---|---|---|
| 2,057,942 A | | 10/1936 | Fay |
| 2,776,521 A | * | 1/1957 | Zimmerman ................. 446/115 |
| 3,550,311 A | | 12/1970 | Fouquart |
| 3,998,004 A | | 12/1976 | Ehrlich |
| 4,253,268 A | * | 3/1981 | Mayr ......................... 446/104 |
| 4,355,781 A | | 10/1982 | Stolpin |
| 4,665,585 A | | 5/1987 | Westin |
| 4,685,892 A | | 8/1987 | Gould et al. |
| 4,761,315 A | * | 8/1988 | Logan et al. .................. 428/33 |
| 4,792,319 A | * | 12/1988 | Svagerko ..................... 446/104 |
| 4,884,988 A | | 12/1989 | McMurray |
| 5,215,490 A | | 6/1993 | Szoradi |
| 6,186,855 B1 | * | 2/2001 | Bauer et al. ................. 446/104 |

FOREIGN PATENT DOCUMENTS

| | | |
|---|---|---|
| DE | 617001 | 8/1935 |
| DE | 23 56 930 A1 | 5/1975 |
| DE | 32 15 282 A1 | 10/1983 |

* cited by examiner

*Primary Examiner*—Carl D. Friedman
*Assistant Examiner*—Naoko Slack
(74) *Attorney, Agent, or Firm*—Edward W. Callan

(57) ABSTRACT

An interlockable element for a structure assembly set includes an at least partially planar body and a connector edge having associated therewith a first A-type and B-type connector pair disposed about a first axis of rotation and a second A-type and B-type connector pair disposed about a second axis of rotation. The first and second axes of rotation are disposed on opposing sides of a generally rectangular quadrilateral of a specified dimension. Each of one pair of diagonally opposite vertices of the quadrilateral are situated internally to each of the A-type connectors and each of the other pair of diagonally opposite vertices of the quadrilateral are situated internally to each of the B-type connectors; and the quadrilateral is generally disposed in a plane that is generally perpendicular to the plane of the body of the interlockable element. The A-type connectors include a pair of rods having protrusions and the B-type connectors include a pair of rods having facing indentations, and the connector pairs of one element are adapted for rotational interlocking engagement with the connector pairs of another like element.

19 Claims, 11 Drawing Sheets

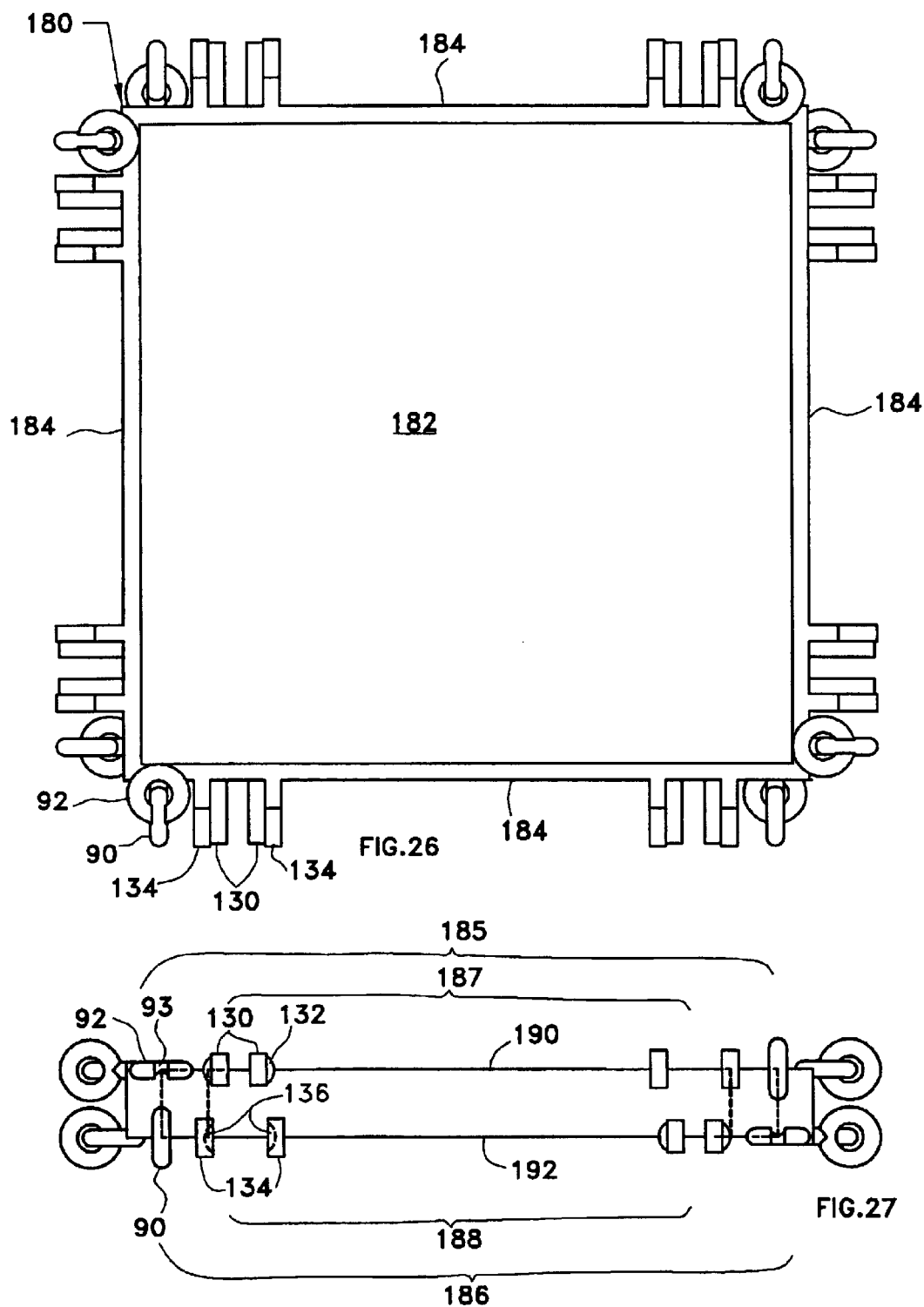

INTERLOCKABLE ELEMENT FOR STRUCTURE ASSEMBLY SET

CROSS-REFERENCE TO RELATED APPLICATION

This is a divisional of application Ser. No. 10/139,874, filed May 7, 2002, now U.S. Pat. No. 6,665,993.

BACKGROUND AND SUMMARY OF THE INVENTION

The present invention generally pertains to interlockable elements for structure assembly sets. Although such assembly sets are particularly useful as toys and/or for education, they also can be used for assembling other structures, such as buildings, furniture, containers and exhibition equipment.

The present invention is particularly directed to improvement of those interlockable elements that individually include an at least partially planar body and one or more connector edges having associated therewith connectors disposed about first and second axes of rotation.

Structure-assembly-set interlockable elements having these features are disclosed in German Patentschrift No. 617011 by Fay and in United States Letters Patent No. 2,057,942 to Fay. In an embodiment disclosed by both Fay documents, the connectors associated with the connector edges of the individual interlockable elements are hinge-ear-type knuckles, with the connectors of one element being joined with the connectors of another element by intermediate pins, such as in a common hinge.

The present invention provides an interlockable element for a structure assembly set, comprising: an at least partially planar body and at least one connector edge having associated therewith a first A-type and B-type connector pair disposed about a first axis of rotation and a second A-type and B-type connector pair disposed about a second axis of rotation; wherein for said at least one connector edge the first and second axes of rotation are disposed on opposing sides of a generally rectangular quadrilateral of a specified dimension, with each of one pair of diagonally opposite vertices of the quadrilateral situated internally to each of said A-type connectors and each of the other pair of diagonally opposite vertices of the quadrilateral situated internally to each of said B-type connectors; wherein the quadrilateral is generally disposed in a plane that is generally perpendicular to the plane of said at least partially planar body; wherein each A-type connector includes a first pair of rods that extend from the at least one connector edge, with each rod of the first pair of rods including a protrusion on the side of the rod of the first pair of rods that faces away from the other rod of the first pair of rods and each B-type connector includes a second pair of rods that extend from the at least one connector edge, with each rod of the second pair of rods including an indentation in the side of the rod of the second pair of rods that faces the other rod of the second pair of rods; and wherein said connector pairs are adapted for rotational interlocking engagement with said connector pairs of another said element. Interlocked elements are held together. Engaged connector pairs are connector pairs in which at least one connector of one connector pair is at least partially embedded in a connector of another connector pair.

The present invention also provides a structure assembly set a first interlockable element and a second interlockable element, each of the first and second elements including an at least partially planar body and at least one connector edge having associated therewith a first A-type and B-type connector pair disposed about a first axis of rotation and a second A-type and B-type connector pair disposed about a second axis of rotation; wherein for each said at least one connector edge the first and second axes of rotation are disposed on opposing sides of a generally rectangular quadrilateral of a specified dimension, with each of one pair of diagonally opposite vertices of the quadrilateral situated internally to each of said A-type connectors and each of the other pair of diagonally opposite vertices of the quadrilateral situated internally to each of said B-type connectors; wherein the quadrilateral is generally disposed in a plane that is generally perpendicular to the plane of said at least partially planar body of the respective interlockable element; wherein each A-type connector includes a first pair of rods that extend from the at least one connector edge, with each rod of the first pair of rods including a protrusion on the side of the rod of the first pair of rods that faces away from the other rod of the first pair of rods and each B-type connector includes a second pair of rods that extend from the at least one connector edge, with each rod of the second pair of rods including an indentation in the side of the rod of the second pair of rods that faces the other rod of the second pair of rods; and wherein said connector pairs of the first element match for rotational interlocking engagement with said connector pairs of the second element.

Preferably, the connector pairs of the first element match for rotational interlocking engagement with the connector pairs of the second element notwithstanding whether or not the first element is turned over relative to the second element.

Additional features of the present invention are described with reference to the detailed description of the preferred embodiments.

BRIEF DESCRIPTION OF THE DRAWING

FIG. 26 is a top view of still yet another preferred embodiment of an interlockable element according to the generic aspect of the present invention.

FIG. 27 is a front view of the interlockable element of FIG. 26, in which only the connectors at the side edges of the element that are near the front edge thereof are shown.

DETAILED DESCRIPTION

Figure 1:
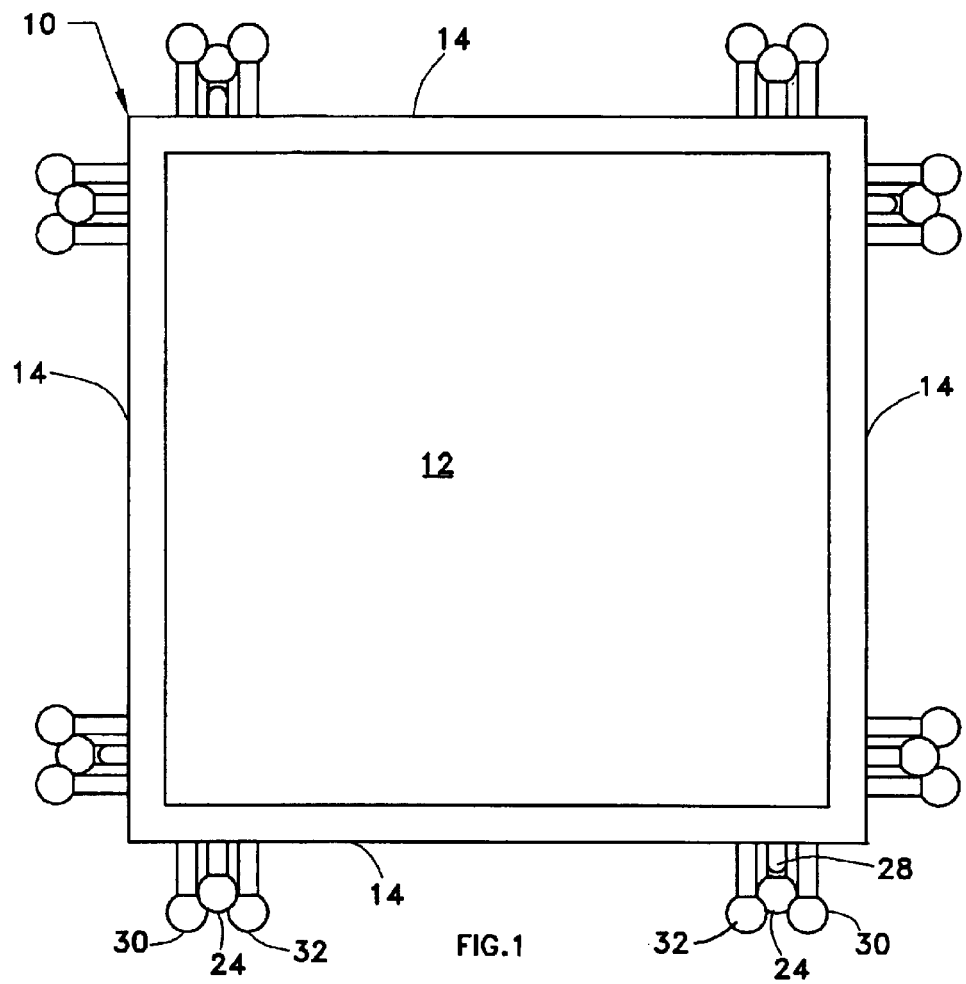
FIG. 1 is a top view of one preferred embodiment of an interlockable element according to a generic aspect of the present invention described and claimed in the cross-referenced parent application.
Figure 2:
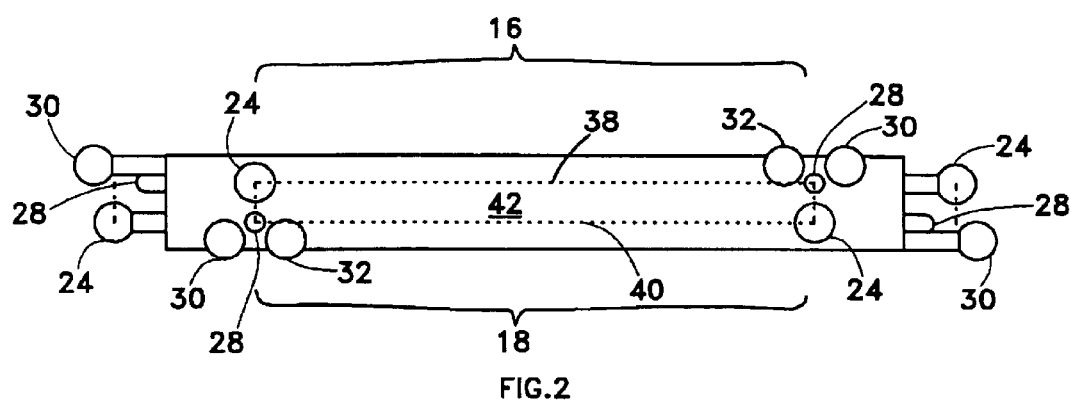
FIG. 2 is a front view of the interlockable element of FIG. 1, in which only the connectors at the side edges of the element that are near the front edge thereof are shown.
Figure 6:
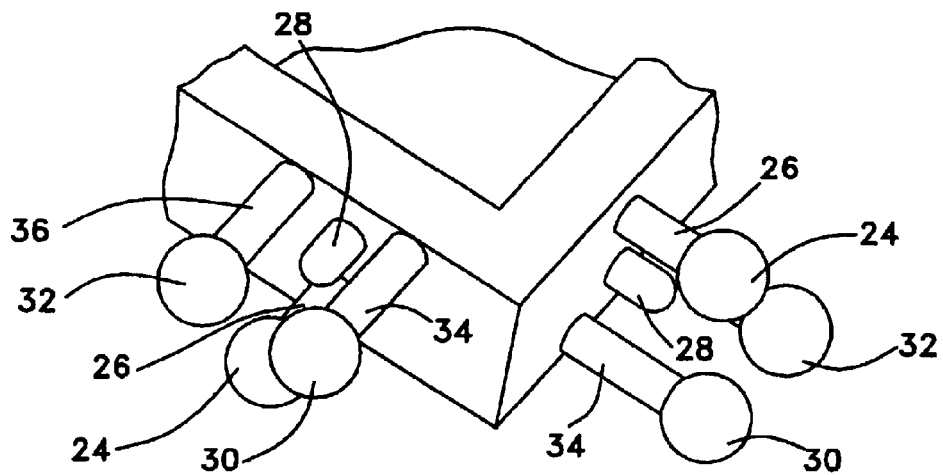
FIG. 6 is a perspective view of a corner of the interlockable element of FIGS. 1 and 2.

Referring to FIGS. 1, 2 and 6, one preferred embodiment of an individual interlockable element 10 according to the generic aspect of the present invention includes an at least partially planar body 12 and a plurality of connector edges 14.

A first connector pair 16 and a second connector pair 18 are associated with each connector edge 14. Each connector pair includes an A-type connector and a B-type connector. As best shown in FIG. 6, each A-type connector includes a ball 24 disposed on a post 26 that extends from the connector edge 14; and each B-type connector includes a contact post 28 and three balls 24, 30, 32 respectively disposed on posts 26, 34, 36 that extend from the connector edge 14. In this embodiment, the ball 24 of the A-type connector of the first connector pair 16 is also included in the B-type connector of the second connector pair 18; and the ball 24 of the A-type connector of the second connector pair 18 is also included in the B-type connector of the first connector pair 16.

Figure 7:
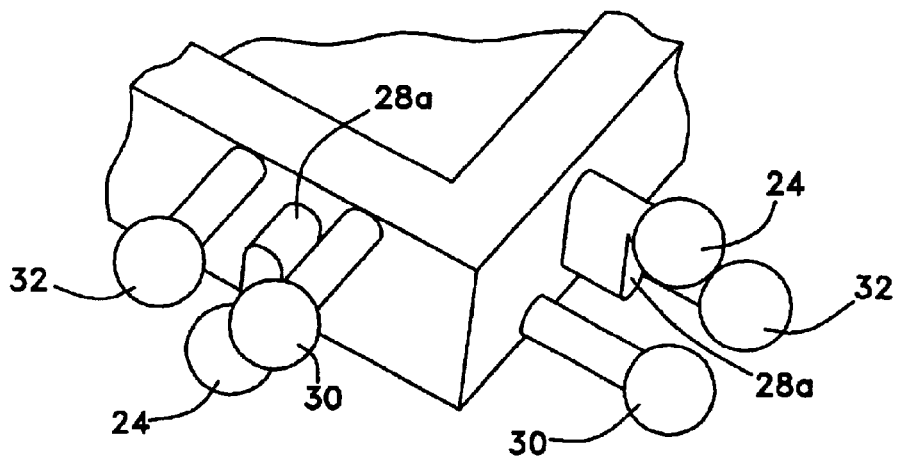
FIG. 7 is a perspective view of a corner of an alternative preferred embodiment of the interlockable element of FIGS. 1 and 2.

When the interlockable elements are made by injection molding of plastic material the connector configuration shown in FIG. 7 is preferred over the connector configuration shown in FIG. 6 because removal of the connectors of FIG. 6 from the mold parts is more complex. The connector configuration of FIG. 7 differs from the connector configuration of FIG. 6 by the disposition of the ball 24 at the end of a lateral extension of the post 28a of the B-type connector rather than upon a separate post 26, as shown in FIG. 6. Nonetheless, illustration of the connector configuration of FIG. 6 is believed to be better suited for the purpose of describing the details of this embodiment.

The A-type connectors are releasably interlockable with the B-type connectors. The diameter of the ball 24 of the A-type connector is slightly larger than the opening between the three balls 24, 30, 32 of the B-type connector; and the posts 26, 34, 36 are slightly flexible so that the ball 24 of the A-type connector can be forced through the opening between the balls 24, 30, 32 of the B-type connector and against the contact post 28 to effect a releasable interlocking engagement between an A-type connector and a B-type connector.

Referring to FIG. 2, the first connector pair 16 is disposed about a first axis of rotation 38 and the second connector pair 18 is disposed about a second axis of rotation 40. For each connector edge 14, the first axis of rotation 38 and the second axis of rotation 40 are disposed respectively on opposing sides of a generally rectangular quadrilateral 42 of a specified dimension; each of one pair of diagonally opposite vertices of the quadrilateral 42 are situated internally to each of the A-type connectors; each of the other pair of diagonally opposite vertices of the quadrilateral 42 are situated internally to each of the B-type connectors; and the quadrilateral 42 is generally disposed in a plane that is generally perpendicular to the plane of the at least partially planar body 12 of the interlockable element 10.

The A-type and B-type connector pairs 16, 18 of each interlockable element 10 of a structure assembly set according to the generic aspect of the present invention match for rotational releasable interlocking engagement with the respective B-type and A-type connector pairs 16, 18 of each of the other interlockable elements 10 of the structure assembly set, notwithstanding whether or not one of the elements 10 is turned over relative to any of the other elements 10.

When a connector pair of one interlockable element 10 is being engaged with a connector pair of a second interlockable element 10, at least a portion of the connector pairs that are being engaged is at least temporarily deformed in that the opening between the balls 24, 30, 32 of the B-type connector becomes larger to allow the ball 24 of an A-type connector to pass through such opening. Such deformation has one directional component that is parallel to the rotational axis of the respective connector pairs that are being at least temporarily deformed and another directional component that is perpendicular to the plane of the at least partially planar body 12 of the interlockable element 10 having the respective connector pair that is being at least temporarily deformed.

An assembly set according to the generic aspect of the present invention that includes the interlockable elements having the configuration shown in and described with reference to FIGS. 1, 2 and 6 may also include other compatible interlockable elements (not shown), in which (a) one or more edges of one or more of the other elements do not have connectors associated therewith, (b) there are more than two connector pairs associated with one or more connector edges, (c) the polygonal shape of the top of the planar body is other than square, (d) the at least partially planar body 12 includes one or more holes an/or one or more non-planar sections, and/or (e) the body is not at least partially planar.

Figure 3:
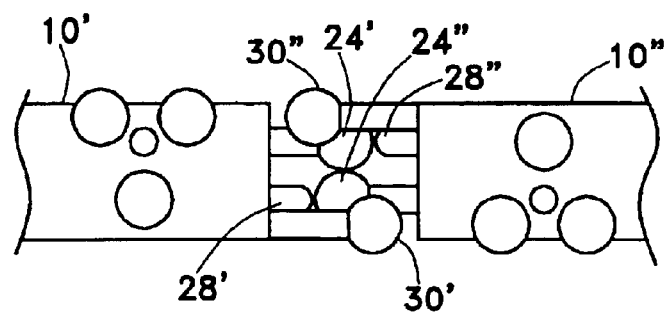
FIG. 3 illustrates interlocking engagement between two interlockable elements having the configuration shown in FIGS. 1 and 2 when the elements are coplanar.

Referring to FIG. 3, it is seen that when both connector pairs associated with a given connector edge of a first interlockable element 10' are engaged with both connector pairs associated with a given connector edge of a second interlockable element 10", the first element 10' is generally coplanar with the second element 10". During such engagement, a surface portion of each A-type connector contacts a surface portion of a B-type connector, and for each interlockable element 10', 10", at least a part of the surface portion of the A-type connector of the first connector pair is also at least a part of the surface portion of the B-type connector of the second connector pair.

Figure 4:
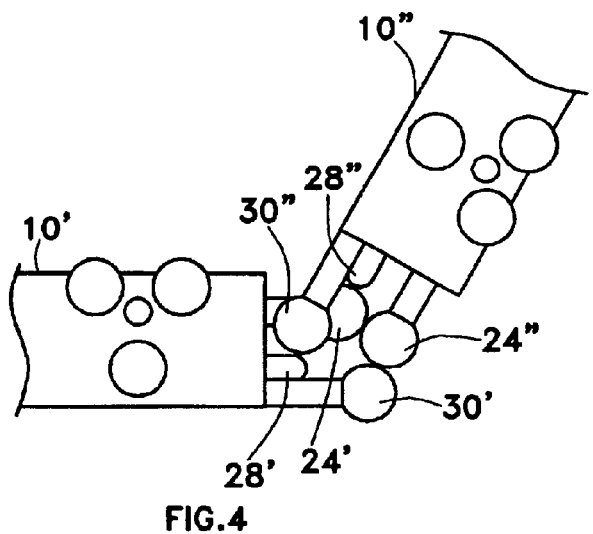
FIG. 4 illustrates interlocking engagement between two interlockable elements having the configuration shown in FIGS. 1 and 2 when one element is rotated with respect to the other element.
Figure 5:
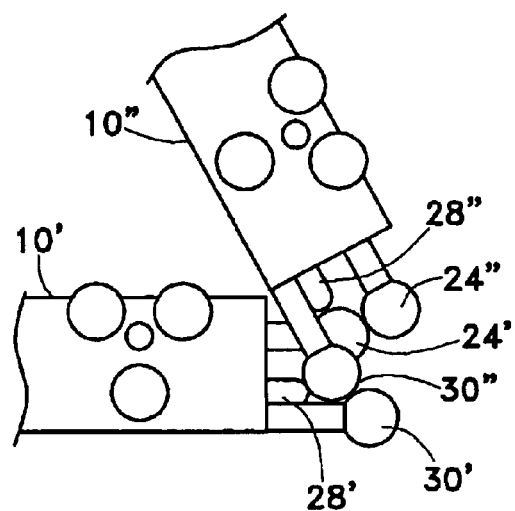
FIG. 5 illustrates interlocking engagement between two interlockable elements having the configuration shown in FIGS. 1 and 2 when the one element is further rotated with respect to the other element from the orientation shown in FIG. 4.

Referring to FIGS. 4 and 5, it is seen that when the second interlockable element 10" is rotated about one of the axes of rotation with respect to the first interlockable element 10' so that the first element 10' is not coplanar with and the second element 10" only one of the two connector pairs of the first element 10' is engaged with one of the two connector pairs of the second element 10". When two elements 10', 10" are interlocked and the angle between the planes of the interlocked elements 10', 10" becomes less than a given threshold, the elements 10', 10" will release from each other. For this embodiment the given threshold angle is approximately as shown in FIG. 5.

Each connector of the first interlockable element 10' has one surface portion or more than one separate and distinct surface portions, at least a segment of which contacts one surface portion or more than one separate and distinct surface portions of each matching connector of the second interlockable element 10" for rotational interlocking of the elements 10', 10" at any angle larger than a given lower threshold (approximately as shown in FIG. 5) between the respective planes of the rotationally interlocked elements 10', 10". It is seen upon comparing FIGS. 3, 4 and 5 that as the second element 10" is rotated with respect to the first element 10', more than one separate and distinct surface portion of the ball 24' of the A-type connector of the first element 10' contacts separate and distinct surface portions of the post 28" and the balls 24", 30", (32" in FIGS. 1, 2 and 6) of the matching B-type connector" of the second connector pair of the second element 10" for rotational interlocking of the first and second elements 10', 10". For each such element, 10', 10", at least a part of the engaging surface portion of the ball 24', 24" of the A-type connector of the first connector pair is also at least a part of the surface portion of the ball 24', 24" of the B-type connector of the second connector pair.

Figure 8:
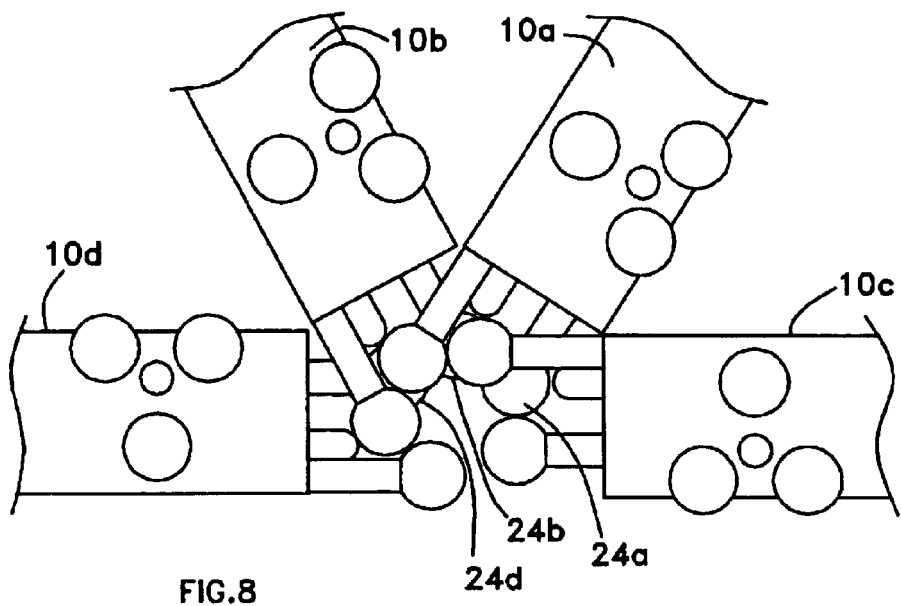
FIG. 8 illustrates one example of simultaneous interlocking engagement between the connector edges of a plurality of interlockable elements having the configuration shown in FIGS. 1, 2 and 6.
Figure 9:
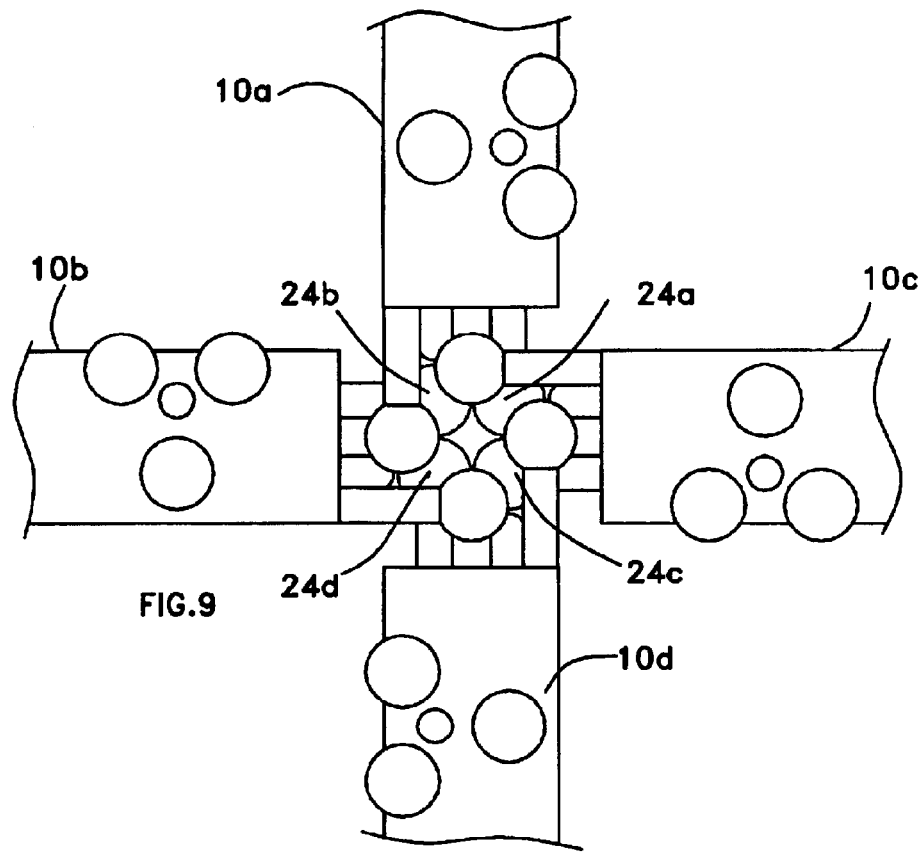
FIG. 9 illustrates another example of simultaneous interlocking engagement between the connector edges of a plurality of interlockable elements having the configuration shown in FIGS. 1, 2 and 6.
Figure 10:
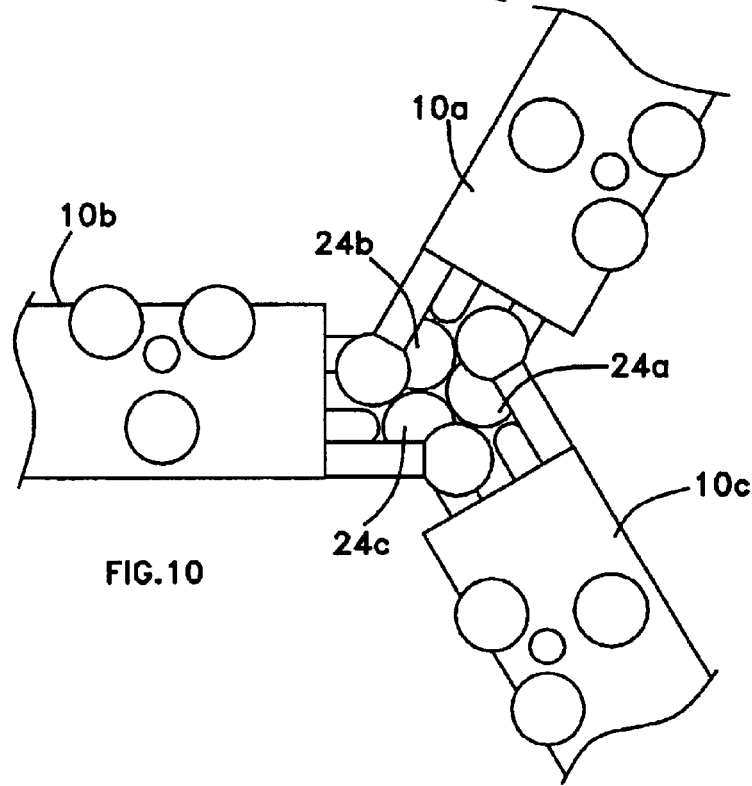
FIG. 10 illustrates still another example of simultaneous interlocking engagement between the connector edges of a plurality of interlockable elements having the configuration shown in FIGS. 1, 2 and 6.

FIGS. 8, 9 and 10 illustrate simultaneous interlocking engagement of the connector pairs associated with one connector edge of one interlockable element with the connector pairs respectively associated with the connector edges of a plurality of other interlockable elements.

Referring to FIG. 8, four interlockable elements 10a, 10b, 10c, 10d, which are as shown in and described with reference to FIGS. 1, 2 and 6, are simultaneously interlocked with one another about parallel axes of rotation associated with a given connector edge of each individual element. The two connector pairs associated with the given connector edge of the first element 10a are respectively engaged with one connector pair associated with the given connector edge of the second element 10b and with one connector pair associated with the given connector edge of the third element 10c. Also, the two connector pairs associated with the given connector edge of the second element 10b are respectively engaged with one connector pair associated with the given connector edge of the first element 10a and with one connector pair associated with the given connector edge of a fourth element 10d.

FIG. 8 shows an A-type connector 24d of the fourth element 10d in an interlocking engagement with a B-type connector of the second element 10b, an A-type connector 24b of the second element 10b in an interlocking engagement with a B-type connector of the first element 10a, and an A-type connector 24a of the first element 10a in an interlocking engagement with a B-type connector of the third element 10c.

Referring to FIG. 9, four interlockable elements 10a, 10b, 10c, 10d, which are as shown in and described with reference to FIGS. 1, 2 and 6, are simultaneously interlocked with one another in a cross formation about parallel axes of rotation associated with a given connector edge of each individual element. Each of the two connector pairs associated with the given connector edge of each element is engaged with one connector pair respectively associated with the given connector edge of different ones of the other elements.

FIG. 9 shows an A-type connector 24d of the fourth element 10d in an interlocking engagement with a B-type connector of the second element 10b, an A-type connector 24b of the second element 10b in an interlocking engagement with a B-type connector of the first element 10a, an A-type connector 24a of the first element 10a in an interlocking engagement with a B-type connector of the third element 10c and an A-type connector 24c of the third element 10c in an interlocking engagement with a B-type connector of the fourth element 10d.

Referring to FIG. 10, three interlockable elements 10a, 10b, 10c, which are as shown in and described with reference to FIGS. 1, 2 and 6, are simultaneously interlocked with one another in a rigid non-rotational condition. One connector pair of the first element 10a is engaged with a matching connector pair of the second element 10b, one connector pair of the second element 10b is engaged with a matching connector pair of the third element 10c, and one connector pair of the third element 10c is engaged with a matching connector pair of the first element 10a, whereby the first, second and third elements 10a, 10b, 10c, are interlocked in a non-rotational condition.

FIG. 10 shows an A-type connector 24c of the third element 10c in an interlocking engagement with a B-type connector of the second element 10b, an A-type connector 24b of the second element 10b in an interlocking engagement with a B-type connector of the first element 10a and an A-type connector 24a of the first element 10a in an interlocking engagement with a B-type connector of the third element 10c.

Figure 11:
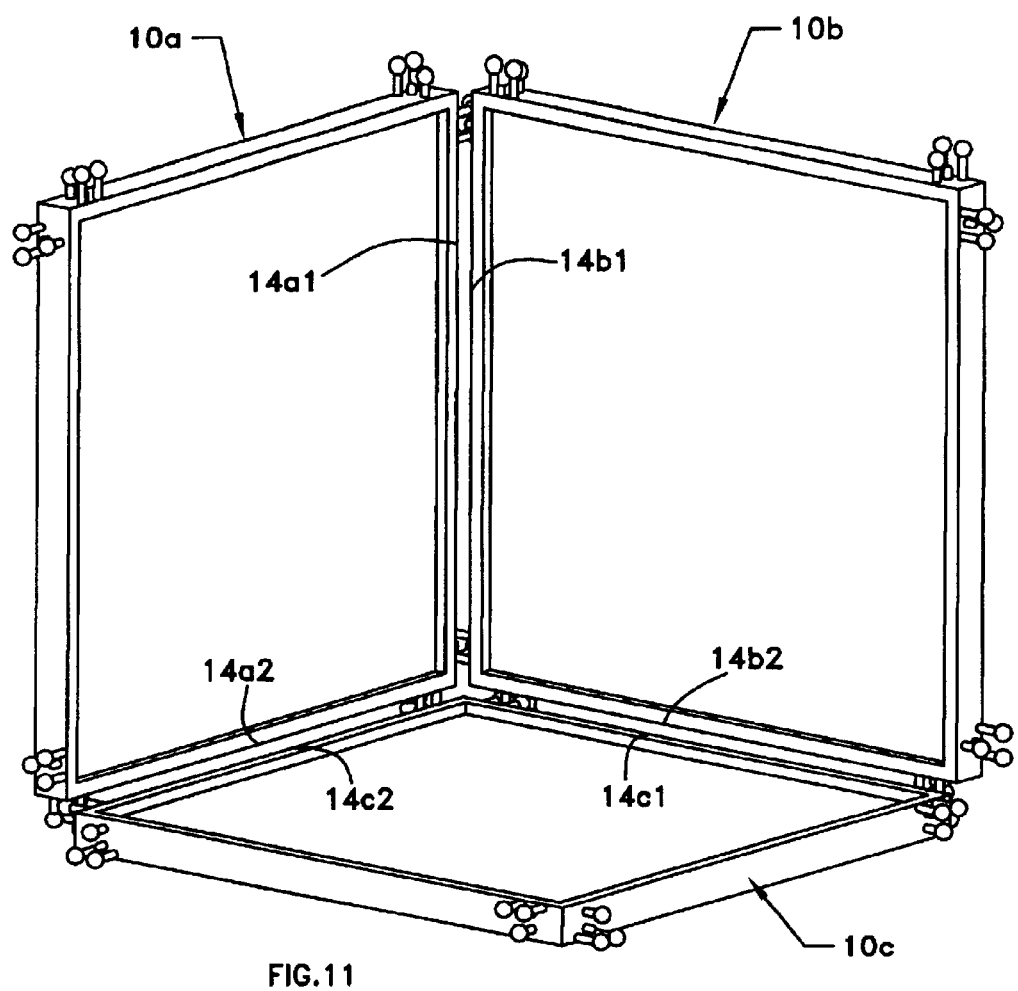
FIG. 11 is a perspective view of three interlockable elements having the configuration shown in FIGS. 1, 2 and 6 being interlocked to assemble a corner structure.

Referring to FIG. 11, three interlockable elements 10a, 10b, 10c, each having first and second connector edges 14 with associated first and second connector pairs as shown in and described with reference to FIGS. 1, 2 and 6, can be interlocked to assemble a rigid corner structure. Each of the connector edges of each element 10a, 10b, 10c has associated therewith a first A-type and B-type connector pair disposed about a first axis of rotation and a second A-type and B-type connector pair disposed about a second axis of rotation; and the connector pairs of each element match for rotational interlocking engagement with the connector pairs of each of the other elements 10a, 10b, 10c.

When a connector pair associated with a first connector edge 14a1 of the first element 10a is engaged with a matching connector pair associated with a first connector edge 14b1 of the second element 10b, a second connector pair associated with a second connector edge 14b2 of the second element 10b is engaged with a matching connector pair associated with a first connector edge 14c1 of the third element 10c, and a second connector pair associated with a second connector edge 14c2 of the third element 10c is engaged with a matching connector pair associated with a second connector edge 14a2 of the first element 10a, the first, second and third elements 10a, 10b, 10c are interlocked in a rigid non-rotational condition.

Figure 12:
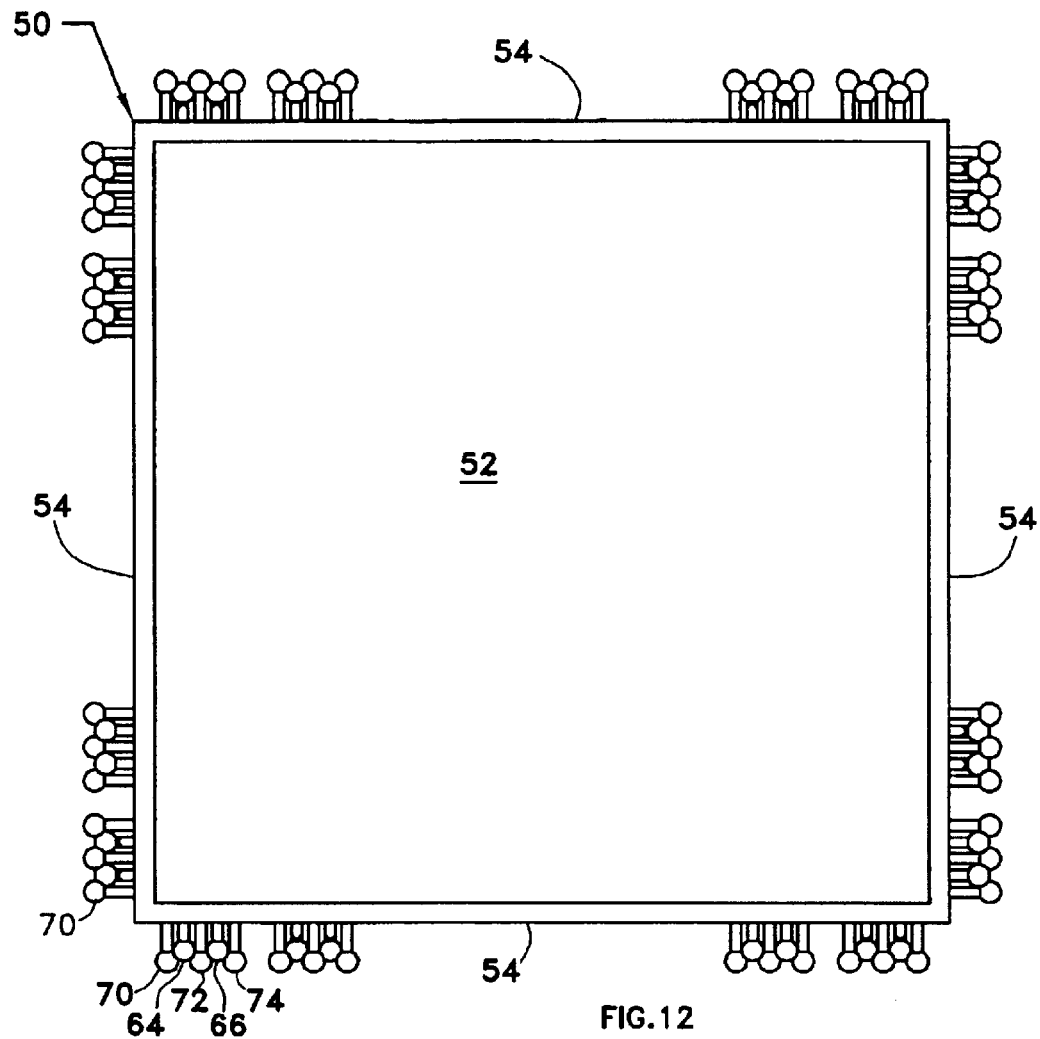
FIG. 12 is a top view of a modified version of the interlockable element of FIGS. 1, 2 and 6.
Figure 13:
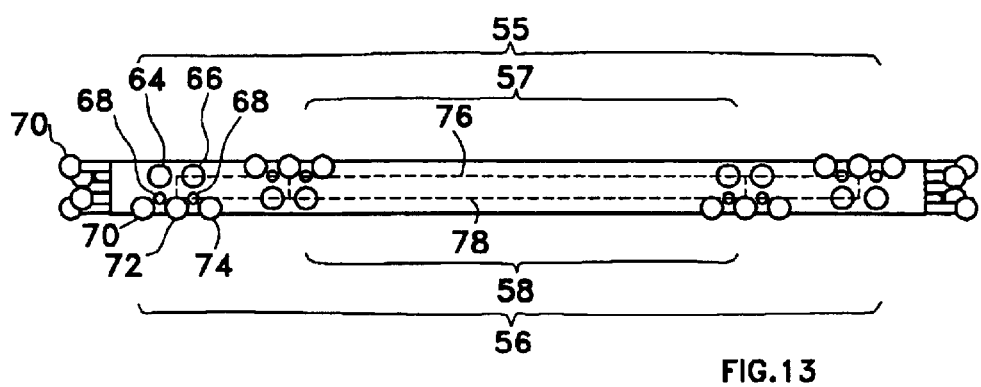
FIG. 13 is a front view of the interlockable element of FIG. 12.

Referring to FIGS. 12 and 13, a modified version 50 of the interlockable element 10 shown in and described with reference to FIGS. 1, 2 and 6 includes an at least partially planar body 52 and a plurality of connector edges 54. A first connector pair 55, a second connector pair 56, a third connector pair 57 and a fourth connector pair 58 are associated with each connector edge 54.

Each connector pair 55, 56, 57, 58 includes an A-type connector and a B-type connector. Each A-type connector includes two balls 64, 66 respectively disposed on two posts that extend from the connector edge 54; and each B-type connector includes two contact posts 68 and five balls 64, 66, 70, 72, 74 respectively disposed on five posts that extend from the connector edge 54. In this embodiment, the two balls 64, 66 of the A-type connectors of the first and third connector pairs 55, 57 are also included in the B-type connectors of the second and fourth connector pairs 56, 58; and the A-type connectors of the second and fourth connector pairs 56, 58 are also included in the B-type connectors of the first and third connector pairs 55, 57.

The A-type connectors are releasably interlockable with the B-type connectors. The diameter of each ball 64, 66 of the A-type connector is slightly larger than each respective opening between the five balls 64, 66, 70, 72, 74 of the B-type connector; and the posts supporting the balls 64, 66, 70, 72, 74 are slightly flexible so that the balls 64, 66 of the A-type connector can be forced through the openings between the balls 64, 66, 70, 72, 74 of the B-type connector and against the contact posts 68 to effect a releasable interlocking engagement between an A-type connector and a B-type connector.

Referring to FIG. 13, the first connector pair 55 and the third connector pair 57 are disposed about a first axis of rotation 76 and the second connector pair 56 and the fourth connector pair 58 are disposed about a second axis of rotation 78. For each connector edge 54, the first axis of rotation 76 and the second axis of rotation 78 are disposed respectively on opposing sides of a pair of generally rectangular quadrilaterals of respectively different specified dimensions; and both quadrilaterals are generally disposed in a plane that is generally perpendicular to the plane of the at least partially planar body 52 of the interlockable element 50. Each of one pair of diagonally opposite vertices of one quadrilateral are situated internally to each of the A-type connectors of the first and second connector pairs 55, 56; each of the other pair of diagonally opposite vertices of the one quadrilateral are situated internally to each of the B-type connectors of the first and second connector pairs 55, 56; each of one pair of diagonally opposite vertices of the other quadrilateral are situated internally to each of the A-type connectors of the third and fourth connector pairs 57, 58; and each of the other pair of diagonally opposite vertices of the other quadrilateral are situated internally to each of the B-type connectors of the third and fourth connector pairs 57, 58.

The A-type and B-type connector pairs 55, 56, 57, 58 of each interlockable element 50 of a structure assembly set according to the generic aspect of the present invention match for rotational releasable interlocking engagement with the respective B-type and A-type connector pairs 55, 56, 57, 58 of each of the other interlockable elements 50 of the structure assembly set, notwithstanding whether or not one of the elements 50 is turned over relative to any of the other elements 50.

When a connector pair of one interlockable element 50 is being engaged with a connector pair of a second interlockable element 50, at least a portion of the connector pairs that are being engaged is at least temporarily deformed in a manner similar to the deformation described above for the embodiment shown in and described with reference to FIGS. 1, 2 and 6.

Although not shown, it is apparent that the two connector-pair quadrilaterals associated with a given connector edge 54 of one element 50 can be respectively engaged with a connector-pair quadrilateral associated with a given connector edge 54 of each of two additional elements 50 to thereby provide an interlockable engagement between the given connector edge of the one element and the respective given connector edges of the two additional elements.

An assembly set according to the generic aspect of the present invention that includes the interlockable elements having the configuration shown in and described with reference to FIGS. 12 and 13 may also include other compatible interlockable elements (not shown), in which (a) one or more edges of one or more of the other elements do not have connectors associated therewith, (b) there are more than four connector pairs associated with one or more connector edges, (c) the polygonal shape of the top of the planar body is other than square, (d) the at least partially planar body 52 includes one or more holes an/or one or more non-planar sections, and/or (e) the body is not at least partially planar.

In other respects, the interlockable element 50 has the same features as the interlockable element 10 shown in and described with reference to FIGS. 1, 2 and 6 and can be assembled with other like interlockable elements 50 in the same manner as shown in and described with reference to FIGS. 3–5 and 8–11.

Figure 14:
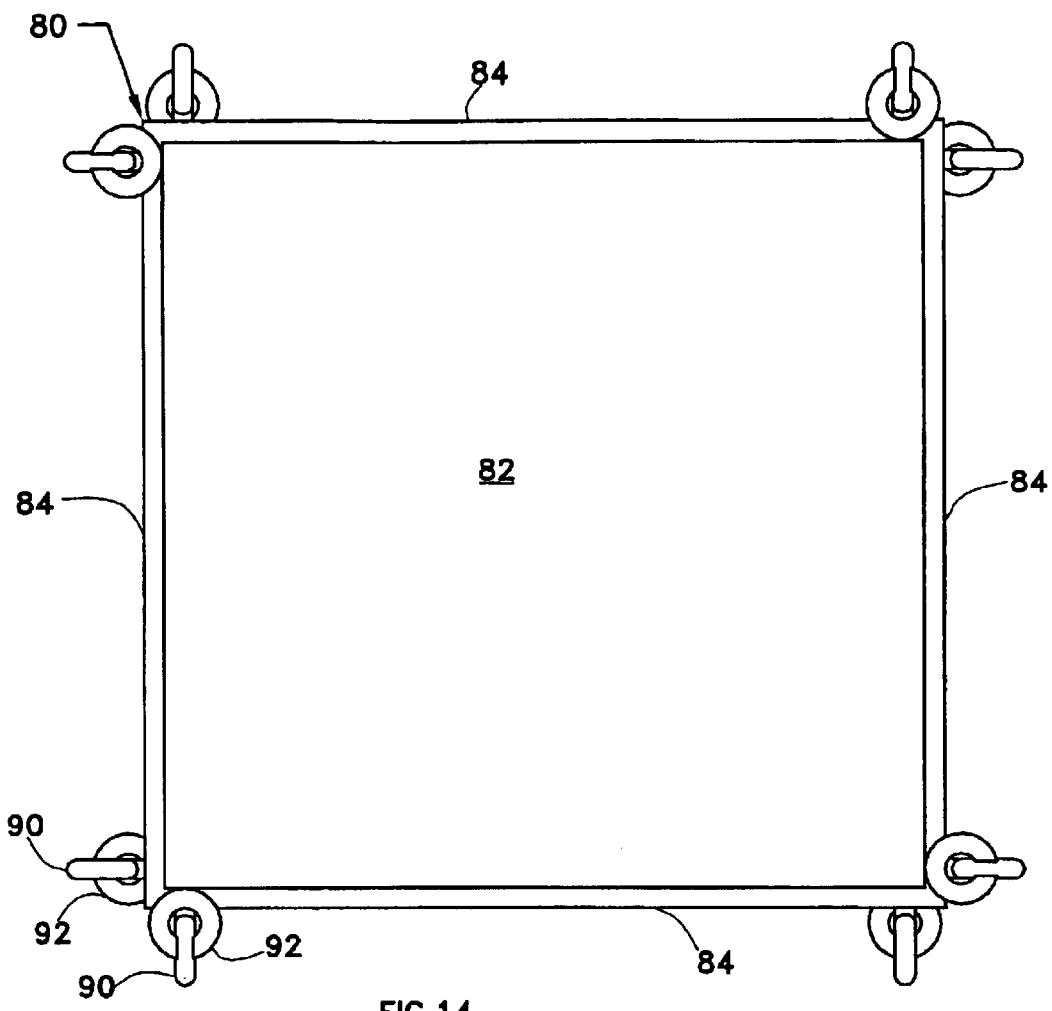
FIG. 14 is a top view of another preferred embodiment of an interlockable element according to the generic aspect of the present invention.
Figure 15:
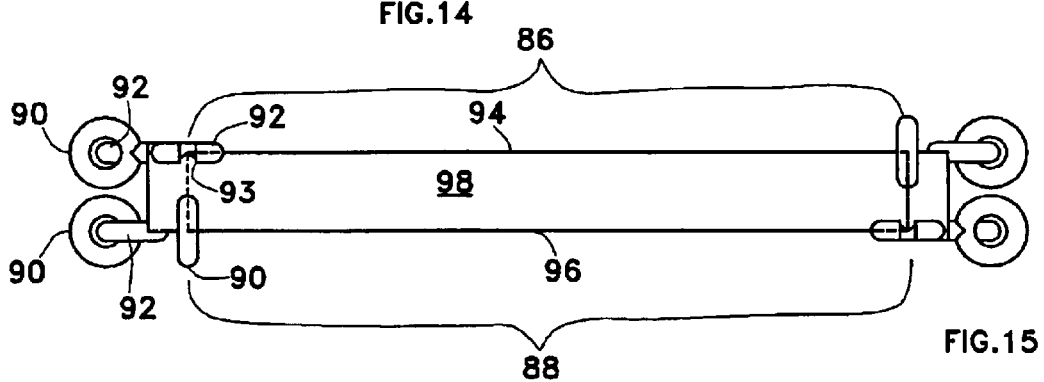
FIG. 15 is a front view of the interlockable element of FIG. 14.
Figure 16:
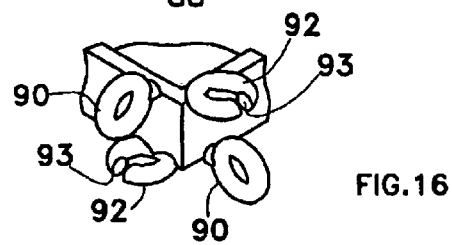
FIG. 16 is a perspective view of a corner of the interlockable element of FIGS. 14 and 15.

Referring to FIGS. 14, 15 and 16, another preferred embodiment of an individual interlockable element 80 according to the generic aspect of the present invention includes an at least partially planar body 82 and a plurality of connector edges 84.

A first connector pair 86 and a second connector pair 88 are associated with each connector edge 84. Each connector pair includes an A-type connector and a B-type connector. Each A-type connector is a ring 90 that extends at a right angle from the connector edge 84; and each B-type connector is a partial ring 92 that extends at a right angle from the connector edge 84 and at a right angle to each ring 90, wherein the partial ring 92 has a slot 93 disposed opposite from where the partial ring 92 extends from the connector edge 84.

The A-type connectors are releasably interlockable with the B-type connectors. The thickness of the ring 90 of the A-type connector is slightly larger than the slot 93 in the partial ring 92 of the B-type connector; and the material (preferably plastic) from which the ring 90 and the partial ring 92 are made is slightly flexible so that the ring 90 of the A-type connector can be forced through the slot 93 in the partial ring 92 of the B-type connector and into the interior of the partial ring 92 to effect a releasable interlocking engagement between an A-type connector and a B-type connector.

Referring to FIG. 15, the first connector pair 86 is disposed about a first axis of rotation 94 and the second connector pair 88 is disposed about a second axis of rotation 96. For each connector edge 84, the first axis of rotation 94 and the second axis of rotation 96 are disposed respectively on opposing sides of a generally rectangular quadrilateral 98 of a specified dimension; each of one pair of diagonally opposite vertices of the quadrilateral 98 are situated internally to each of the A-type connectors; each of the other pair of diagonally opposite vertices of the quadrilateral 98 are situated internally to each of the B-type connectors; and the quadrilateral 98 is generally disposed in a plane that is generally perpendicular to the plane of the at least partially planar body 82 of the interlockable element 80.

The A-type and B-type connector pairs 86, 88 of each interlockable element 80 of a structure assembly set according to the generic aspect of the present invention match for rotational releasable interlocking engagement with the respective B-type and A-type connector pairs 86, 88 of each of the other interlockable elements 80 of the structure assembly set, notwithstanding whether or not one of the elements 80 is turned over relative to any of the other elements 80.

When a connector pair of one interlockable element 80 is being engaged with a connector pair of a second interlockable element 80, at least a portion of the connector pairs that are being engaged is at least temporarily deformed in that the slot 93 in the partial ring 92 becomes larger to allow a ring 90 to pass through the slot 93. Such deformation has one directional component that is parallel to the rotational axis of the respective connector pairs that are being at least temporarily deformed.

An assembly set according to the generic aspect of the present invention that includes the interlockable elements having the configuration shown in and described with reference to FIGS. 14, 15 and 16 may also include other compatible interlockable elements (not shown), in which (a) one or more edges of one or more of the other elements do not have connectors associated therewith, (b) there are more than two connector pairs associated with one or more connector edges, (c) the polygonal shape of the top of the planar body is other than square, (d) the at least partially planar body 82 includes one or more holes an/or one or more non-planar sections, and/or (e) the body is not at least partially planar.

The interlockable element 80 can be assembled with other like interlockable elements 80 in the same manner as shown in and described with reference to FIGS. 3–5 and 8–11.

Figure 17:
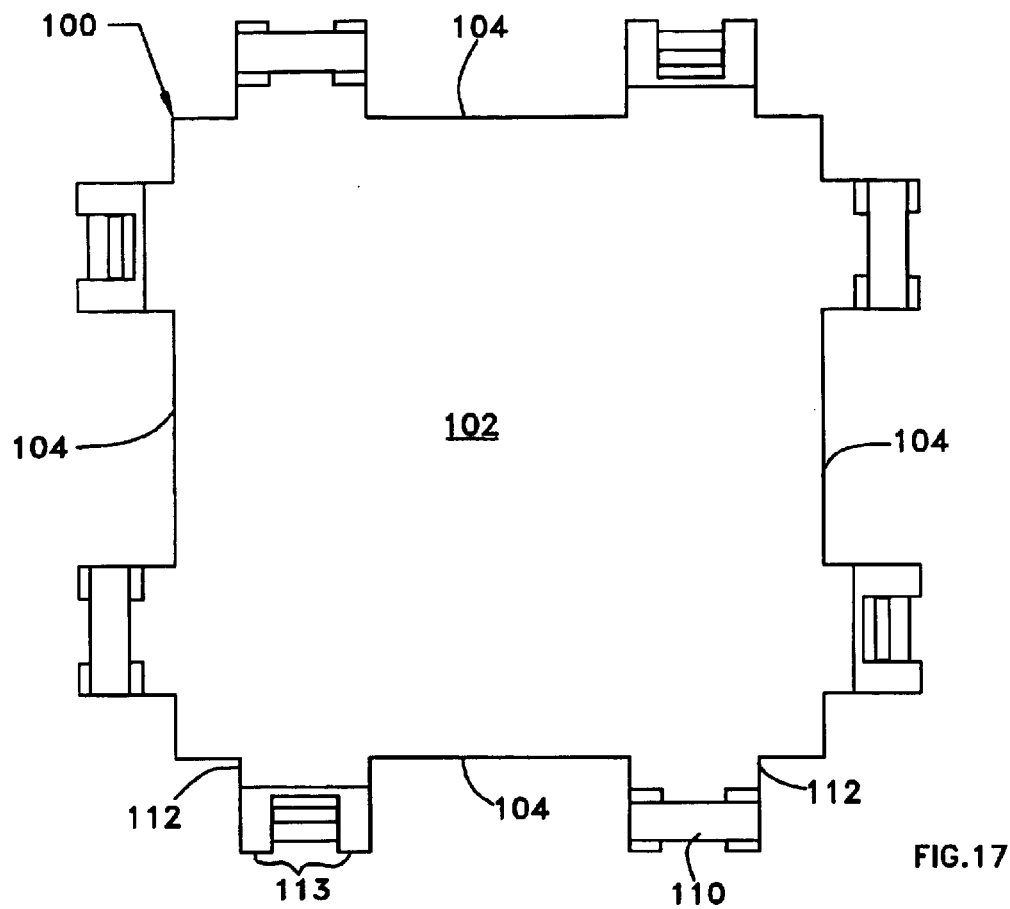
FIG. 17 is a top view of still another preferred embodiment of an interlockable element according to the generic aspect of the present invention.
Figure 18:
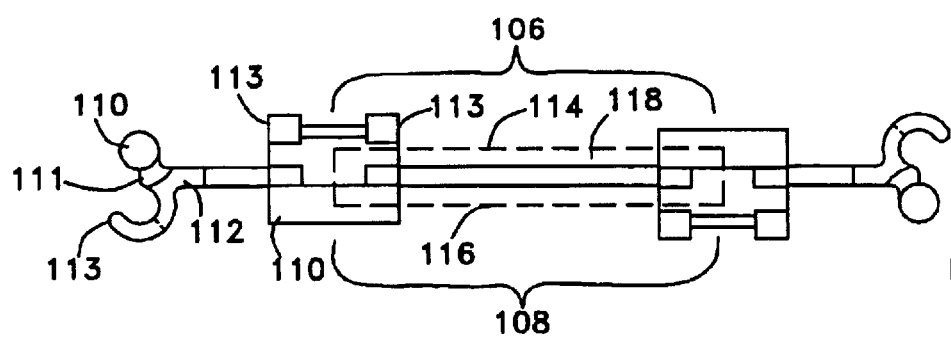
FIG. 18 is a front view of the interlockable element of FIG. 17, in which only the connectors at the side edges of the element that are near the front edge thereof are shown.
Figure 19:
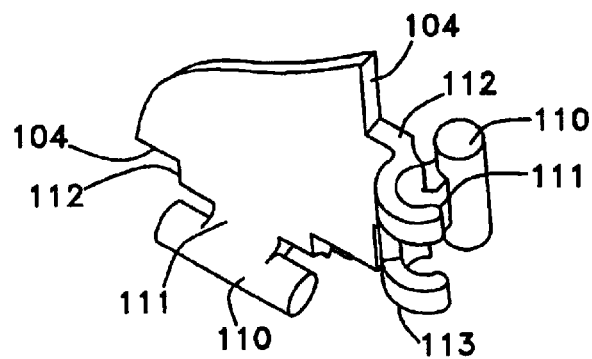
FIG. 19 is a perspective view of a corner of the interlockable element of FIGS. 17 and 18.

Referring to FIGS. 17, 18 and 19, still another preferred embodiment of an individual interlockable element 100 according to the generic aspect of the present invention includes an at least partially planar body 102 and a plurality of connector edges 104.

A first connector pair 106 and a second connector pair 108 are associated with each connector edge 104. Each connector pair includes an A-type connector and a B-type connector. As best shown in FIG. 19, each A-type connector is a hinge cylinder 110 disposed at the end of a span 111 from an extended portion 112 of the connector edge 104; and each B-type connector includes the span 111 and a pair of spaced-apart hinge ears 113 disposed on the same extended portion 112 of the connector edge 104 as the span 111 to the hinge cylinder 110. In this embodiment, the span 111 to the hinge cylinder 110 of the A-type connector of the first connector pair 106 is also included in the B-type connector of the second connector pair 108; and the span 111 to the hinge cylinder 110 of the A-type connector of the second connector pair 108 is also included in the B-type connector of the first connector pair 106.

The A-type connectors are releasably interlockable with the B-type connectors. The diameter of the hinge cylinder 110 is slightly larger than the opening between the span 111 and the distal portions of the hinge ears 113; and the material from which the hinge cylinder 110, the span 111 and the hinge ears 113 are made (preferably plastic) is slightly flexible so that the hinge cylinder 110 can be forced through the opening between the span 111 and the distal portions of the hinge ears 113 and into the respective interiors of the hinge ears 113 to effect a releasable interlocking engagement between an A-type connector and a B-type connector.

Referring to FIG. 18, the first connector pair 106 is disposed about a first axis of rotation 114 and the second connector pair 108 is disposed about a second axis of rotation 116. For each connector edge 104, the first axis of rotation 114 and the second axis of rotation 116 are disposed respectively on opposing sides of a generally rectangular quadrilateral 118 of a specified dimension; each of one pair of diagonally opposite vertices of the quadrilateral 118 are situated internally to each of the A-type connectors; each of the other pair of diagonally opposite vertices of the quadrilateral 118 are situated internally to each of the B-type connectors; and the quadrilateral 118 is generally disposed in a plane that is generally perpendicular to the plane of the at least partially planar body 102 of the interlockable element 100.

The A-type and B-type connector pairs 106, 108 of each interlockable element 100 of a structure assembly set according to the generic aspect of the present invention match for rotational releasable interlocking engagement with the respective B-type and A-type connector pairs 106, 108 of each of the other interlockable elements 100 of the structure assembly set, notwithstanding whether or not one of the elements 100 is turned over relative to any of the other elements 100.

When a connector pair of one interlockable element 100 is being engaged with a connector pair of a second interlockable element, at least a portion of the connector pairs that are being engaged is at least temporarily deformed in that the opening between the span 111 and the distal portions of the hinge ears 113 becomes larger to allow the hinge cylinder 110 to pass through such opening. Such deformation has one directional component that is perpendicular to the plane of the at least partially planar body 102 of the interlockable element 100 having the respective connector pair that is being at least temporarily deformed.

An assembly set according to the generic aspect of the present invention that includes the interlockable elements having the configuration shown in and described with reference to FIGS. 17, 18 and 19 may also include other compatible interlockable elements (not shown), in which (a) one or more edges of one or more of the other elements do not have connectors associated therewith, (b) there are more than two connector pairs associated with one or more connector edges, (c) the polygonal shape of the top of the planar body is other than square, (d) the at least partially planar body 102 includes one or more holes an/or one or more non-planar sections, and/or (e) the body is not at least partially planar.

The interlockable element 100 can be assembled with other like interlockable elements 100 in the same manner as shown in and described with reference to FIGS. 3–5 and 8–11.

Figure 20:
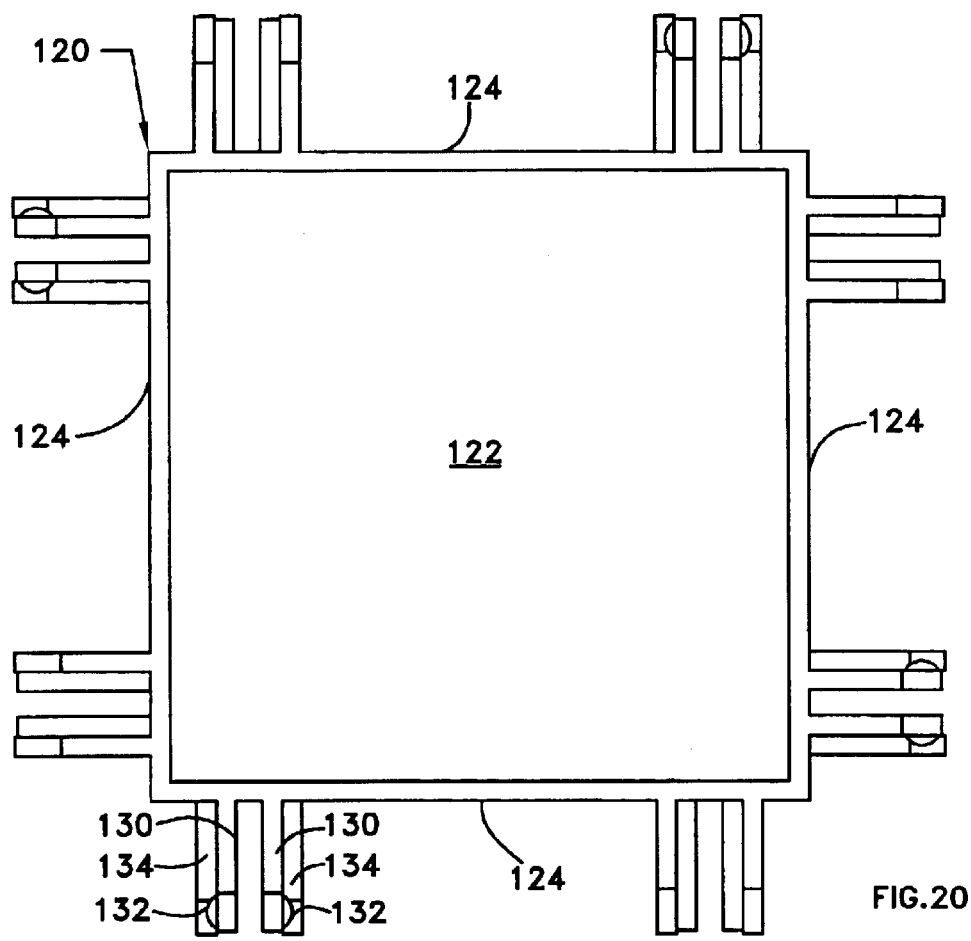
FIG. 20 is a top view of a preferred embodiment of an interlockable element according to the aspect of present invention claimed herein.
Figure 21:
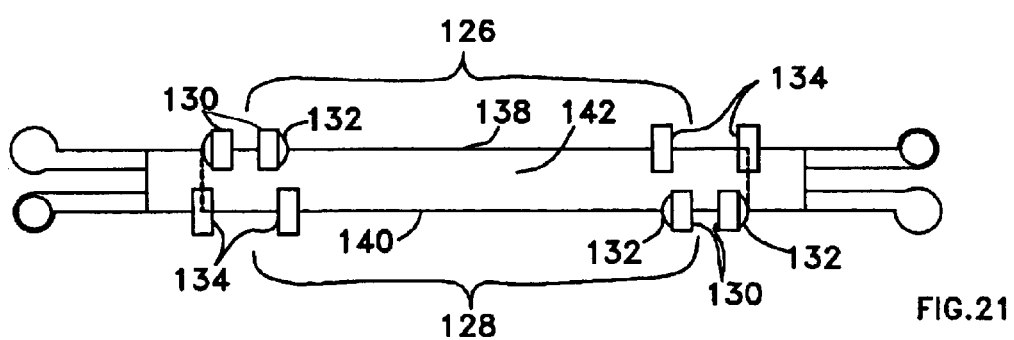
FIG. 21 is a front view of the interlockable element of FIG. 20, in which only the connectors at the side edges of the element that are near the front edge thereof are shown.
Figure 22:
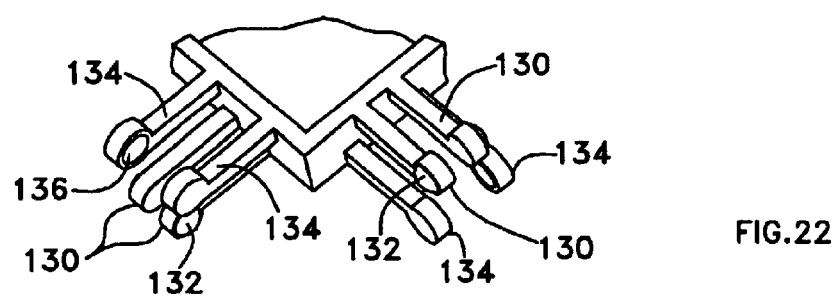
FIG. 22 is a perspective view of a corner of the interlockable element of FIGS. 20 and 21.

Referring to FIGS. 20, 21 and 22, a preferred embodiment of an individual interlockable element 120 according to the aspect of the present invention claimed herein includes an at least partially planar body 122 and a plurality of connector edges 124.

A first connector pair 126 and a second connector pair 128 are associated with each connector edge 124. Each connector pair includes an A-type connector and a B-type connector. As best shown in FIG. 22, each A-type connector includes a first pair of rods 130 that extend from the connector edge 124, with each rod including a protrusion 132 on the side of the rod 130 that faces away from the other rod 130 of the first pair of rods; and each B-type connector includes a second pair of rods 134 that extend from the connector edge 124, with each rod 134 including an indentation 136 in the side of the rod 134 that faces the other rod 134 of the second pair of rods.

The A-type connectors are releasably interlockable with the B-type connectors. The distance between the outer edges of the protrusions 132 is larger than the opening between the second pair of rods 134, and the material from which the rods 130 and the rods 134 are made (preferably plastic) is slightly flexible so that the pair of protrusions 132 can be forced into the pair of indentations 136 to effect a releasable interlocking engagement between an A-type connector and a B-type connector.

Referring to FIG. 21, the first connector pair 126 is disposed about a first axis of rotation 138 and the second connector pair 128 is disposed about a second axis of rotation 140. For each connector edge 124, the first axis of rotation 138 and the second axis of rotation 140 are disposed respectively on opposing sides of a generally rectangular quadrilateral 142 of a specified dimension; each of one pair of diagonally opposite vertices of the quadrilateral 142 are situated internally to each of the A-type connectors; each of the other pair of diagonally opposite vertices of the quadrilateral 142 are situated internally to each of the B-type connectors; and the quadrilateral 142 is generally disposed in a plane that is generally perpendicular to the plane of the at least partially planar body 122 of the interlockable element 120.

The A-type and B-type connector pairs 126, 128 of each interlockable element 120 of a structure assembly set according to the present invention match for rotational releasable interlocking engagement with the respective B-type and A-type connector pairs 126, 128 of each of the other interlockable elements 120 of the structure assembly set, notwithstanding whether or not one of the elements 120 is turned over relative to any of the other elements 120.

When a connector pair of one interlockable element 120 is being engaged with a connector pair of a second interlockable element, at least a portion of the connector pairs that are being engaged is at least temporarily deformed in that the opening between the second pair of rods 134 of the B-type connector becomes larger and the protrusions 132 from the A-type connectors are squeezed to allow the protrusions 132 to pass through such opening and into the indentations 136. Such deformation has one directional component that is parallel to the rotational axis of the respective connector pairs that are being at least temporarily deformed.

An assembly set according to the present invention that includes the interlockable elements having the configuration shown in and described with reference to FIGS. 20, 21, 22 may also include other compatible interlockable elements (not shown), in which (a) one or more edges of one or more of the other elements do not have connectors associated therewith, (b) there are more than two connector pairs associated with one or more connector edges, (c) the polygonal shape of the top of the planar body is other than square, (d) the at least partially planar body 122 includes one or more holes an/or one or more non-planar sections, and/or (e) the body is not at least partially planar.

The interlockable element 120 can be assembled with other like interlockable elements 120 in the same manner as shown in and described with reference to FIGS. 3–5 and 8–11.

Figure 23:
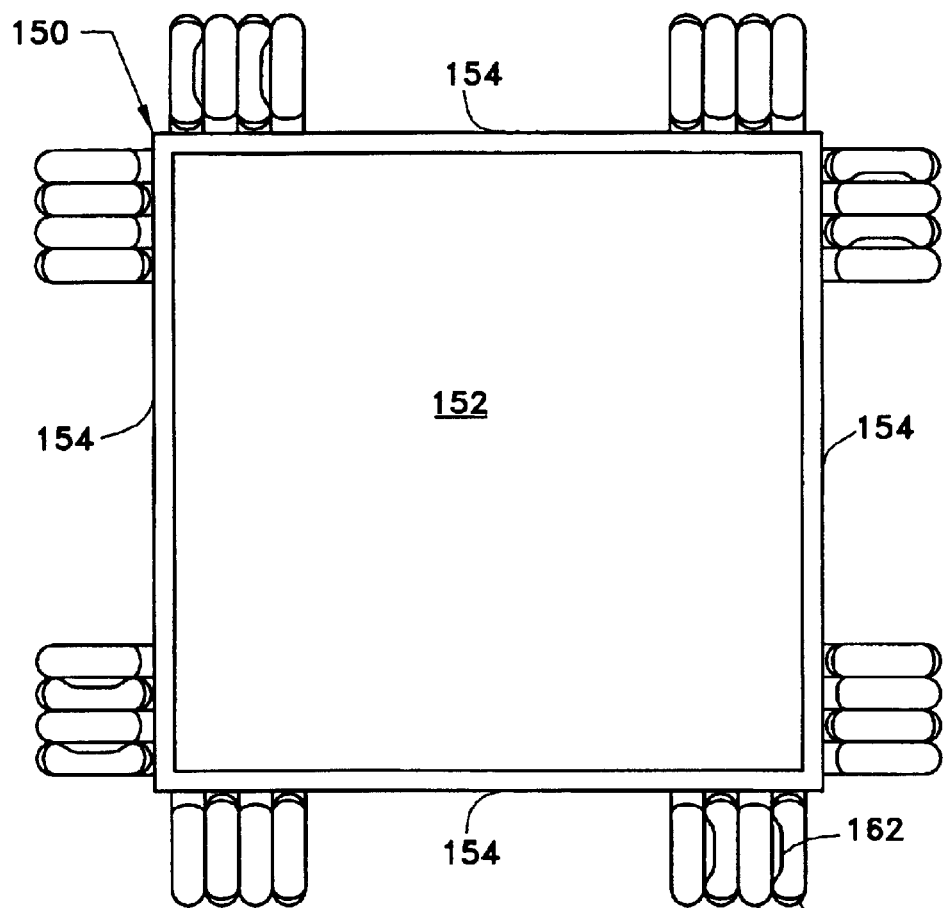
FIG. 23 is a top view of still a further preferred embodiment of an interlockable element according to the generic aspect of the present invention.
Figure 24:
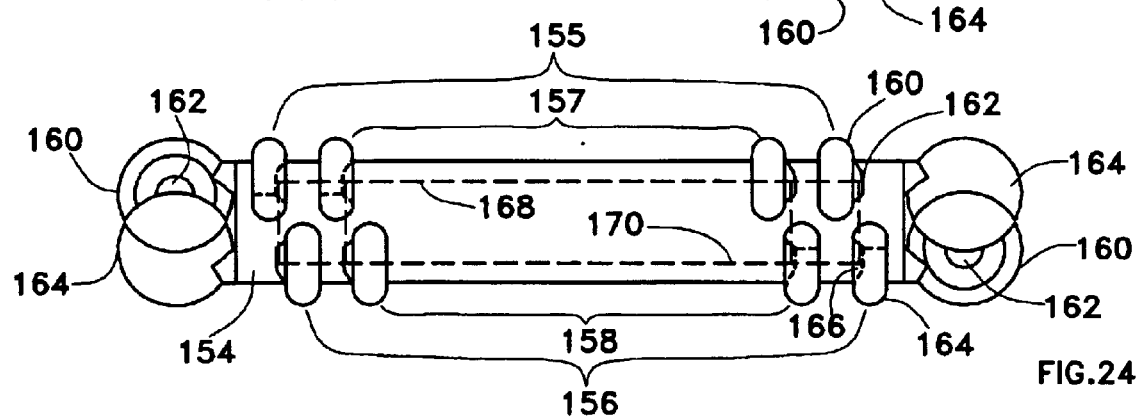
FIG. 24 is a front view of the interlockable element of FIG. 23.
Figure 25:
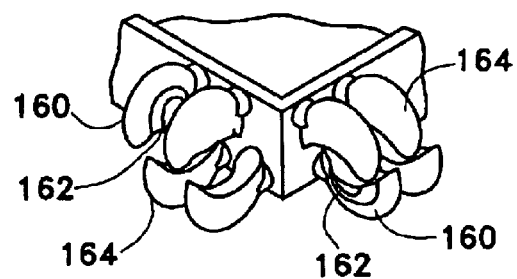
FIG. 25 is a perspective view of a corner of the interlockable element of FIGS. 23 and 24.

Referring to FIGS. 23, 24 and 25, a further preferred embodiment of an individual interlockable element 150 according to the generic aspect of the present invention includes an at least partially planar body 152 and a plurality of connector edges 154. A first connector pair 155, a second connector pair 156, a third connector pair 157 and a fourth connector pair 158 are associated with each connector edge 154.

Each connector pair includes an A-type connector and a B-type connector. Each A-type connector is a claw 160 that extends from the connector edge 154 and includes a protrusion 162 from the side of the claw that faces the near end of the connector edge 154. Each B-type connector is a claw 164 that extends from the side of the connector edge 154 and includes an indentation 166 in the side of the claw 164 that faces the far end of the connector edge 154.

The A-type connectors are releasably interlockable with the B-type connectors. The claws 160, 164 are made of a material (preferably plastic) that is slightly flexible so that, in accordance with the spacing of the connector pairs, the protrusions 162 from the claws 160 of the A-type connectors can be forced into the indentations 166 in the claws 164 of the B-type connectors to effect a releasable interlocking engagement between an A-type connector and a B-type connector.

Referring to FIG. 24, the first connector pair 155 and the third connector pair 157 are disposed about a first axis of rotation 168 and the second connector pair 156 and the fourth connector pair 158 are disposed about a second axis of rotation 170. For each connector edge 154, the first axis of rotation 168 and the second axis of rotation 170 are disposed respectively on opposing sides of a pair of generally rectangular quadrilaterals of respectively different specified dimensions; and both quadrilaterals are generally disposed in a plane that is generally perpendicular to the plane of the at least partially planar body 152 of the interlockable element 150. Each of one pair of diagonally opposite vertices of one quadrilateral are situated internally to each of the A-type connectors of the first and second connector pairs 155, 156; each of the other pair of diagonally opposite vertices of the one quadrilateral are situated internally to each of the B-type connectors of the first and second connector pairs 155, 156; each of one pair of diagonally opposite vertices of the other quadrilateral are situated internally to each of the A-type connectors of the third and fourth connector pairs 157, 158; and each of the other pair of diagonally opposite vertices of the other quadrilateral are situated internally to each of the B-type connectors of the third and fourth connector pairs 157, 158.

The A-type and B-type connector pairs 155, 156, 157, 158 of each interlockable element 150 of a structure assembly set according to the generic aspect of the present invention match for rotational releasable interlocking engagement with the respective B-type and A-type connector pairs 155, 156, 157, 158 of each of the other interlockable elements 150 of the structure assembly set, notwithstanding whether or not one of the elements 150 is turned over relative to any of the other elements 150.

When a connector pair of one interlockable element 150 is being engaged with a connector pair of a second interlockable element 150, at least a portion of the connector pairs that are being engaged is at least temporarily deformed in that the protrusions 162 and the sides of the claws 164 that define the indentations 166 are deformed to allow the protrusions 162 to pass into the indentations 166. Such deformation has one directional component that is parallel to the rotational axis of the respective connector pairs that are being at least temporarily deformed.

An assembly set according to the generic aspect of the present invention that includes the interlockable elements having the configuration shown in and described with reference to FIGS. 23, 24 and 25 may also include other compatible interlockable elements (not shown), in which (a) one or more edges of one or more of the other elements do not have connectors associated therewith, (b) there are more than four connector pairs associated with one or more connector edges, (c) the polygonal shape of the top of the planar body is other than square, (d) the at least partially planar body 152 includes one or more holes an/or one or more non-planar sections, and/or (e) the body is not at least partially planar.

The interlockable element 150 can be assembled with other like interlockable elements 150 in the same manner as shown in and described with reference to FIGS. 3–5 and 8–11.

Referring to FIGS. 26 and 27, a further preferred embodiment of an individual interlockable element 180 according to the generic aspect of the present invention includes an at least partially planar body 182 and a plurality of connector edges 184.

A first connector pair 185, a second connector pair 186, a third connector pair 187 and a fourth connector pair 188 are associated with each connector edge 184.

Each of the first and second connector pairs 185, 186 includes an A-type connector and a B-type connector. Each A-type connector is a ring 90 that extends at a right angle from the connector edge 184; and each B-type connector is a partial ring 92 that extends at a right angle from the connector edge 184 and at a right angle to each ring 90, wherein the partial ring 92 has a slot 93 disposed opposite from where the partial ring 92 extends from the connector edge 184, such as shown in and described with reference to FIGS. 14–16.

Each of the third and fourth connector pairs 187, 188 includes a C-type connector and a D-type connector. Each C-type connector includes a first pair of rods 130 that extend from the connector edge 184, with each rod including a protrusion 132 on the side of the rod 130 that faces away from the other rod 130 of the first pair, and each D-type connector includes a second pair of rods 134 that extend from the connector edge 184, with each rod 134 including an indentation 136 in the side of the rod 134 that faces the other rod 134 of the second pair, such as shown in and described with reference to FIGS. 20–22.

Referring to FIG. 27, the first connector pair 185 and the third connector pair 187 are disposed about a first axis of rotation 190 and the second connector pair 186 and the fourth connector pair 188 are disposed about a second axis of rotation 192. For each connector edge 184, the first axis of rotation 190 and the second axis of rotation 192 are disposed respectively on opposing sides of each of a pair of generally rectangular first and second quadrilaterals of respectively different specified dimensions; and each quadrilateral is generally disposed in a plane that is generally perpendicular to the plane of the at least partially planar body 182 of the interlockable element 180.

Each of one pair of diagonally opposite vertices of the first quadrilateral are situated internally to each of the A-type connectors of the first and second connector pairs 185, 186; each of the other pair of diagonally opposite vertices of the first quadrilateral are situated internally to each of the B-type connectors of the first and second connector pairs 185, 186; each of one pair of diagonally opposite vertices of the second quadrilateral are situated internally to each of the C-type connectors of the third and fourth connector pairs 187, 188; and each of the other pair of diagonally opposite vertices of the second quadrilateral are situated internally to each of the D-type connectors of the third and fourth connector pairs 187, 188.

An assembly set according to the generic aspect of the present invention that includes the interlockable elements having the configuration shown in and described with reference to FIGS. 26 and 27 may also include other compatible interlockable elements (not shown), in which (a) one or more edges of one or more of the other elements do not have connectors associated therewith, (b) there are more than four connector pairs associated with one or more connector edges, (c) the polygonal shape of the top of the planar body is other than square, (d) the at least partially planar body 182 includes one or more holes an/or one or more non-planar sections, and/or (e) the body is not at least partially planar.

The interlockable element 180 can be assembled with other like interlockable elements 180 in the same manner as shown in and described with reference to FIGS. 3–5 and 8–11.

In alternative versions of the embodiment of FIGS. 26 and 27, one or more additional connector pairs are disposed about the first axis of rotation 190 and a like number of additional connector pairs are disposed about the second axis of rotation 192; such additional connector pairs may or may not be of a different type than either the A-type and B-type connector pairs or the C-type and D-type connector pairs; the connector pairs may be of a type other than those shown in FIGS. 26 and 27, such as of the type shown in and described with reference to FIGS. 1, 2 and 6, FIGS. 17–19 and/or FIGS. 23–25 or of a type not specifically shown or described herein; provided that the different types of connector pairs that are combined in association with a given connector edge have same axes of rotation and are not dimensionally incompatible with one another.

In various alternative embodiments, (a) a connector edge does not have to be straight; (b) a connector edge can have any thick and/or thin shape; (c) a connector edge does not have to lie in the plane of the at least partially planar body of its respective interlockable element; (d) a connector does not have to be directly connected to its respective associated connector edge; (e) an edge of an interlockable element does not have to be a connector edge or have any particular length and can for example be the whole or part of an inside perimeter of a hole in an interlockable element; (f) a connector or a connector pair do not have to be releasable, but can be permanently interlocked upon engagement; (g) a connector edge may have many identical and/or different connector pairs; (h) the full length of one or more connector edges can be filled out with connector pairs; (i) when all A-type connectors match for rotational interlocking engagement with all B-type connectors that does not mean that all A-type connectors are identical or that all B-type connectors are identical; (j) A-type connectors and B-type connectors are not necessarily different; (k) there is no requirement that an element of two interlocked elements can be turned over relative to the other element and still be interlockable therewith (l) there is no requirement that more than two interlockable elements can be mutually interlocked along a common multitude of connector edges as shown in FIGS. 8, 9, and 10; (m) although in the embodiments described herein the elements are shown as square-shaped, the elements may be of other shapes, such as other regular polygons, as for example triangles, pentagons, hexagons etc., non-regular polygons with irregular angles between the sides thereof, non-polygons and practically any other shape; (n) although at least two interlockable elements of the structure assembly set include an at least partially planar body, such condition is not required for all elements of the structure assembly set; (o) although at least two elements of the structure assembly set include a first connector pair and a second connector pair, it is not a requirement that any of the elements have any additional connector pairs; (p) the structure assembly set may include a compatible interlockable element with a connector edge that includes only one connector pair; (q) a connector does not have any limitation as to size, connectedness or coherence; (r) a connector can be located in whole or part between portions of another connector associated with the same connector edge; (s) rotational releasable interlocking engagement is not limited to any minimum angle of rotation; (t) two interlocked elements do not necessarily have a lower threshold angle between the planes of their at least partially planar bodies at which the elements will release from each other; (u) interlocking engagement does not require an at least temporary deformation of any portion of some connector, interlocking engagement alternatively can be frictional, adhesive or the like; (v) interlocked engaged elements are not necessarily mechanically impeded from being separated from one another; (w) the elements of the structure assembly set may be life size or model size; (x) the elements of the structure assembly set may for example include windows, doors, wheels, engines, detectors, chips and/or other components; (y) the structure assembly set may also include a compatible interlockable element in which the body is not at least partially planar; and/or (z) although the drawing figures herein are to relative scale for the described preferred embodiments, the connectors may be made larger or smaller relative to the overall dimensions of the respective interlockable elements.

The above-described embodiments and other embodiments not described herein are adapted for use as a toy and/or for educational use, or for other uses, such as for assembling buildings, furniture, containers and exhibition equipment.

The elements of the structure assembly set may be made primarily by injection molding of plastic. Because of the flexible or deforming nature of some of the connectors described herein, the connectors may flex or deform during removal from the mold, thereby eliminating or reducing a requirement to use side-core pulling for removing the elements from the molds.

The advantages specifically stated herein do not necessarily apply to every conceivable embodiment of the present invention. Further, such stated advantages of the present invention are only examples and should not be construed as the only advantages of the present invention. While the above description contains many specificities, these should not be construed as limitations on the scope of the present invention, but rather as examples of the preferred embodiments described herein. Other variations are possible and the scope of the present invention should be determined not by the embodiments described herein but rather by the claims and their legal equivalents. The claims require no implicit limitations. Each claim is to be construed explicitly as stated, or by its legal equivalent.

What is claimed is:

1. An interlockable element for a structure assembly set, comprising:

an at least partially planar body and at least one connector edge having associated therewith a first A-type and B-type connector pair disposed about a first axis of rotation and a second A-type and B-type connector pair disposed about a second axis of rotation;

wherein for said at least one connector edge the first and second axes of rotation are disposed on opposing sides of a generally rectangular quadrilateral of a specified dimension, with each of one pair of diagonally opposite vertices of the quadrilateral situated internally to each of said A-type connectors and each of the other pair of diagonally opposite vertices of the quadrilateral situated internally to each of said B-type connectors;

wherein the quadrilateral is generally disposed in a plane that is generally perpendicular to the plane of said at least partially planar body;

wherein each A-type connector includes a first pair of rods that extend from the at least one connector edge, with each rod of the first pair of rods including a protrusion on the side of the rod of the first pair of rods that faces away from the other rod of the first pair of rods and each B-type connector includes a second pair of rods that extend from the at least one connector edge, with each rod of the second pair of rods including an indentation in the side of the rod of the second pair of rods that faces the other rod of the second pair of rods; and wherein said connector pairs are adapted for rotational interlocking engagement with said connector pairs of another said element.

2. An interlockable element according to claim 1, wherein the A-type connectors are releasably interlockable with the B-type connectors.

3. An interlockable element according to claim 1, wherein the distance between the outer edges of the protrusions of the first pair of rods is larger than the opening between the second pair of rods.

4. An interlockable element according to claim 1, wherein the material from which the rods of the first pair and the rods of the second pair of rods are made is slightly flexible so that the pair of protrusions can be forced into the pair of indentations to effect a releasable interlocking engagement between an A-type connector and a B-type connector.

5. An interlockable element according to claim 1, wherein one or more edges of the at least partially planar body do not have connectors associated therewith.

6. An interlockable element according to claim 1, wherein one or more of the connector edges have more than two connector pairs associated therewith.

7. An interlockable element according to claim 1, wherein the at least partially planar body includes one or more holes.

8. An interlockable element according to claim 1, wherein the at least partially planar body includes one or more non-planar sections.

9. A structure assembly set comprising a first interlockable element and a second interlockable element, each of the first and second elements including an at least partially planar body and at least one connector edge having associated therewith a first A-type and B-type connector pair disposed about a first axis of rotation and a second A-type and B-type connector pair disposed about a second axis of rotation;

wherein for each said at least one connector edge the first and second axes of rotation are disposed on opposing sides of a generally rectangular quadrilateral of a specified dimension, with each of one pair of diagonally opposite vertices of the quadrilateral situated internally to each of said A-type connectors and each of the other pair of diagonally opposite vertices of the quadrilateral situated internally to each of said B-type connectors;

wherein the quadrilateral is generally disposed in a plane that is generally perpendicular to the plane of said at least partially planar body of the respective interlockable element;

wherein each A-type connector includes a first pair of rods that extend from the at least one connector edge, with each rod of the first pair of rods including a protrusion on the side of the rod of the first pair of rods that faces away from the other rod of the first pair of rods and each B-type connector includes a second pair of rods that extend from the at least one connector edge, with each rod oft second pair of rods including an indentation in the side of the rod of the second pair of rods that faces the other rod of the second pair of rods; and wherein said connector pairs of the first element match for rotational interlocking engagement with said connector pairs of the second element.

10. A structure assembly set according to claim 9, wherein the A-type connectors are releasably interlockable with the B-type connectors.

11. A structure assembly set according to claim 9, wherein the distance between the outer edges of the protrusions of the first pair of rods is larger than the opening between the second pair of rods.

12. A structure assembly set according to claim 9, wherein the material from which the rods of the first pair and the rods of the second pair of rods are made is slightly flexible so that the pair of protrusions can be forced into the pair of indentations to effect a releasable interlocking engagement between an A-type connector and a B-type connector.

13. A structure assembly set according to claim 9, wherein the A-type and B-type connector pairs of each interlockable element match for rotational releasable interlocking engagement with the respective B-type and A-type connector pairs of each of the other interlockable elements of the structure assembly set, notwithstanding whether or not one of the elements is turned over relative to any of the other elements.

14. A structure assembly set according to claim 9, wherein when a connector pair of one said interlockable element is being engaged with a connector pair of a second said interlockable element, at least a portion of the connector pairs that are being engaged is at least temporarily deformed in that the opening between the second pair of rods of the B-type connector becomes larger and the protrusions from the A-type connectors are squeezed to allow the protrusions to pass through such opening and into the indentations.

15. A structure assembly set according to claim 14, wherein such deformation has one directional component that is parallel to the rotational axis of the respective connector pairs that are being at least temporarily deformed.

16. A structure assembly set according to claim 9, wherein one or more edges of one or each of the first and second interlockable elements do not have connectors associated therewith.

17. A structure assembly set according to claim 9, wherein one or more edges of one or each of the first and second interlockable elements have more than two connector pairs associated therewith.

18. A structure assembly set according to claim 9, wherein the at least partially planar body of one or each of the first and second interlockable elements includes one or more holes.

19. A structure assembly set according to claim 9, wherein the at least partially planar body of one or each of the first and second interlockable elements includes one or more non-planar sections.

* * * * *

UNITED STATES PATENT AND TRADEMARK OFFICE
CERTIFICATE OF CORRECTION

PATENT NO. : 6,925,770 B2
DATED : August 9, 2005
INVENTOR(S) : Jens Ole Sorensen et al.

It is certified that error appears in the above-identified patent and that said Letters Patent is hereby corrected as shown below:

Column 1,
Lines 31-61, cancel the paragraph beginning with "The present invention provides" and ending with "another connector pair", and insert the following paragraph:

The present invention provides an interlockable element for a structure assembly set, comprising: an at least partially planar body and at least one connector edge having associated therewith a first A-type and B-type connector pair disposed about a first axis of rotation and a second A-type and B-type connector pair disposed about a second axis of rotation; wherein for said at least one connector edge the first and second axes of rotation are disposed on opposing sides of a generally rectangular quadrilateral of a specified dimension, with each of one pair of diagonally opposite vertices of the quadrilateral situated internally to each of said A-type connectors and each of the other pair of diagonally opposite vertices of the quadrilateral situated internally to each of said B-type connectors; wherein the quadrilateral is generally disposed in a plane that is generally perpendicular to the plane of said at least partially planar body; wherein for said first and second connector pairs, each A-type connector includes a protrusion and each B-type connector includes an indentation; and wherein said connector pairs are adapted for rotational interlocking engagement with said connector pairs of another said element. Interlocked elements are held together. Engaged connector pairs are connector pairs in which at least one connector of one connector pair is at least partially embedded in a connector of another connector pair.

Column 1, line 62 - Column 2, line 24,
Cancel the paragraph beginning with "The present invention also" and ending with "of the second element", and insert the following paragraph:

--The present invention also provides a structure assembly set a first interlockable element and a second interlockable element, each of the first and second elements including an at least partially planar body and at least one connector edge having associated therewith a first A-type and B-type connector pair disposed about a first axis of rotation and a second A-type and B-type connector pair disposed about a second axis of rotation; wherein for each said at least one connector edge the first and second axes of rotation are disposed on opposing sides of a generally rectangular quadrilateral of a specified dimension, with each of one pair of diagonally opposite vertices of the quadrilateral situated internally to each of said A-type connectors and each of the other pair of diagonally opposite vertices of the quadrilateral situated internally to each of said B-type connectors; wherein the quadrilateral is generally disposed in a plane that is generally perpendicular to the plane of said at least partially planar body of the respective interlockable element; wherein for said first and second connector pairs, each A-type connector includes a protrusion and each B-type connector includes an indentation; and wherein said connector pairs of the first element match for rotational interlocking engagement with said connector pairs of the second element.--

Column 12,
After line 36, which ends with "the connector edge 154", insert the following two paragraphs:

In another aspect, one connector pair consists of the outer rods 130, 134 disposed along a common axis, such as axis 138, and another connector pair consists of the inner rods 130, 134 disposed along the same common axis 138. In accordance with this other aspect, a first connector pair consisting of an outer A-type rod 130 and an outer B-type rod 134 are disposed about the first axis 138; a second connector pair consisting of an outer A-type rod 130 and an outer B-type rod 134 are disposed about the second axis 140; a third connector pair consisting of an inner A-type rod 130 and an inner B-type rod 134 are disposed about the first axis 138; and a fourth connector pair consisting of an inner A-type rod 130 and an inner B-type rod 134 are disposed about the second axis 140.

UNITED STATES PATENT AND TRADEMARK OFFICE
CERTIFICATE OF CORRECTION

PATENT NO. : 6,925,770 B2
DATED : August 9, 2005
INVENTOR(S) : Jens Ole Sorensen et al.

It is certified that error appears in the above-identified patent and that said Letters Patent is hereby corrected as shown below:

Column 12 (cont'd),

In accordance with this other aspect, the protrusion 132 of the A-type connector rod 130 of the first connector pair and the protrusion 132 of the A-type connector rod 130 of the second connector pair face in opposite directions; the indentation 136 of the B-type connector rod 134 paired with an A-type connector rod 130 faces in the same direction as the protrusion 132 of the paired A-type connector rod 130; and the protrusion 132 of the A-type connector rod 130 of the first connector pair and the protrusion 132 of the A-type connector rod 130 of the third connector pair face in opposite directions.

Column 13,
After line 3, insert the following paragraph:

The protrusion 162 of the A-type connector claw 160 of the first connector pair 155 and the protrusion 162 of the A-type connector claw 160 of the second connector pair 156 face in opposite directions; the indentation 166 of the B-type connector claw 164 paired with an A-type connector claw 160 faces in the same direction as the protrusion 162 of the paired A-type connector claw 160; and the protrusion 162 of the A-type connector claw 160 of the first connector pair 155 and the protrusion 162 of the A-type connector claw 160 of the third connector pair 157 face in the same direction.

Column 16,
Lines 16-48, delete the text beginning with "1. An interlockable element" and ending with "another said element" and insert the following claim:

--1. An interlockable element for a structure assembly set, comprising:
an at least partially planar body and at least one connector edge having associated therewith a first A-type and B-type connector pair disposed about a first axis of rotation and a second A-type and B-type connector pair disposed about a second axis of rotation;
wherein for said at least one connector edge the first and second axes of rotation are disposed on opposing sides of a generally rectangular quadrilateral of a specified dimension, with each of one pair of diagonally opposite vertices of the quadrilateral situated internally to each of said A-type connectors and each of the other pair of diagonally opposite vertices of the quadrilateral situated internally to each of said B-type connectors;
wherein the quadrilateral is generally disposed in a plane that is generally perpendicular to the plane of said at least partially planar body;
wherein for said first and second connector pairs, each A-type connector includes a protrusion and each B-type connector includes an indentation; and
wherein said connector pairs are adapted for rotational interlocking engagement with said connector pairs of another said element.--

Lines 52 and 56, "claim 1," should read -- claim 34, --.

UNITED STATES PATENT AND TRADEMARK OFFICE
CERTIFICATE OF CORRECTION

PATENT NO. : 6,925,770 B2
DATED : August 9, 2005
INVENTOR(S) : Jens Ole Sorensen et al.

It is certified that error appears in the above-identified patent and that said Letters Patent is hereby corrected as shown below:

Column 17,
Lines 6-40, delete the text beginning with "9. A structure assembly" and ending with "pairs of the second element" and insert the following claim:

9. A structure assembly set comprising a first interlockable element and a second interlockable element, each of the first and second elements including an at least partially planar body and at least one connector edge having associated therewith a first A-type and B-type connector pair disposed about a first axis of rotation and a second A-type and B-type connector pair disposed about a second axis of rotation;
wherein for each said at least one connector edge the first and second axes of rotation are disposed on opposing sides of a generally rectangular quadrilateral of a specified dimension, with each of one pair of diagonally opposite vertices of the quadrilateral situated internally to each of said A-type connectors and each of the other pair of diagonally opposite vertices of the quadrilateral situated internally to each of said B-type connectors;
wherein the quadrilateral is generally disposed in a plane that is generally perpendicular to the plane of said at least partially planar body of the respective interlockable element;
wherein for said first and second connector pairs, each A-type connector includes a protrusion and each B-type connector includes an indentation; and
wherein said connector pairs of the first element match for rotational interlocking engagement with said connector pairs of the second element.

Line 43, "claim 9," should read -- claim 20, --.

Column 18,
Lines 3 and 15, "claim 9," should read -- claim 20, --.
After line 42, which ends with "non-planar sections", and insert the following claims:

20. A structure assembly set according to Claim 9, wherein each A-type connector includes a first pair of rods that extend from the at least one connector edge, with each rod of the first pair of rods including a said protrusion on the side of the rod of the first pair of rods that faces away from the other rod of the first pair of rods and each B-type connector includes a second pair of rods that extend from the at least one connector edge, with each rod of the second pair of rods including a said indentation in the side of the rod of the second pair of rods that faces the other rod of the second pair of rods.

21. A structure assembly set according to Claim 9, wherein each A-type connector includes a first pair of claws that extend from the at least one connector edge, with each claw of the first pair of claws including a said protrusion on the side of the claw of the first pair of claws that faces away from the other claw of the first pair of claws and each B-type connector includes a second pair of claws that extend from the at least one connector edge, with each claw of the second pair of claws including a said indentation in the side of the claw of the second pair of claws that faces the other claw of the second pair of claws.

22. A structure assembly set according to Claim 21, wherein the distance between the outer edges of the protrusions of the first pair of claws is larger than the opening between the second pair of claws.

23. A structure assembly set according to Claim 21, wherein the material from which the claws of the first pair and the claws of the second pair of claws are made is slightly flexible so that the pair of protrusions can be forced into the pair of indentations to effect a releasable interlocking engagement between an A-type connector and a B-type connector.

UNITED STATES PATENT AND TRADEMARK OFFICE
CERTIFICATE OF CORRECTION

PATENT NO. : 6,925,770 B2
DATED : August 9, 2005
INVENTOR(S) : Jens Ole Sorensen et al.

It is certified that error appears in the above-identified patent and that said Letters Patent is hereby corrected as shown below:

Column 18 (cont'd),

24. A structure assembly set according to Claim 21, wherein when a connector pair of one said interlockable element is being engaged with a connector pair of a second said interlockable element, at least a portion of the connector pairs that are being engaged is at least temporarily deformed in that the opening between the second pair of claws of the B-type connector becomes larger and the protrusions from the A-type connectors are squeezed to allow the protrusions to pass through such opening and into the indentations.

25. A structure assembly set according to Claim 24, wherein such deformation has one directional component that is parallel to the rotational axis of the respective connector pairs that are being at least temporarily deformed.

26. A structure assembly set according to Claim 9, wherein the protrusion of the A-type connector of the first connector pair and the protrusion of the A-type connector of the second connector pair face in opposite directions.

27. A structure assembly set according to Claim 26, wherein the indentation of the B-type connector paired with a said A-type connector faces in the same direction as the protrusion of the paired said A-type connector.

28. A structure assembly set according to Claim 9, wherein the at least one connector edge further has associated therewith a third A-type and B-type connector pair disposed about the first axis of rotation and a fourth A-type and B-type connector pair disposed about the second axis of rotation; and wherein for said third and fourth connector pairs, each A-type connector includes a protrusion and each B-type connector includes an indentation.

29. A structure assembly set according to Claim 28, wherein the protrusion of the A-type connector of the first connector pair and the protrusion of the A-type connector of the second connector pair face in opposite directions.

30. A structure assembly set according to Claim 29, wherein the protrusion of the A-type connector of the first connector pair and the protrusion of the A-type connector of the third connector pair face in opposite directions.

31. A structure assembly set according to Claim 29, wherein the protrusion of the A-type connector of the first connector pair and the protrusion of the A-type connector of the third connector pair face in the same direction.

32. A structure assembly set according to Claim 9, wherein when a connector pair of one said interlockable element is being engaged with a connector pair of a second said interlockable element, at least a portion of the connector pairs that are being engaged is at least temporarily deformed.

33. A structure assembly set according to Claim 32, wherein such deformation has one directional component that is parallel to the rotational axis of the respective connector pairs that are being at least temporarily deformed.

34. An interlockable element according to Claim 1, wherein each A-type connector includes a first pair of rods that extend from the at least one connector edge, with each rod of the first pair of rods including a said protrusion on the side of the rod of the first pair of rods that faces away from the other rod of the first pair of rods and each B-type connector includes a second pair of rods that extend from the at least one connector edge, with each rod of the second pair of rods including a said indentation in the side of the rod of the second pair of rods that faces the other rod of the second pair of rods.

UNITED STATES PATENT AND TRADEMARK OFFICE
CERTIFICATE OF CORRECTION

PATENT NO. : 6,925,770 B2
DATED : August 9, 2005
INVENTOR(S) : Jens Ole Sorensen et al.

It is certified that error appears in the above-identified patent and that said Letters Patent is hereby corrected as shown below:

Column 18 (cont'd),

35. An interlockable element according to Claim 1, wherein each A-type connector includes a first pair of claws that extend from the at least one connector edge, with each claw of the first pair of claws including a said protrusion on the side of the claw of the first pair of claws that faces away from the other claw of the first pair of claws and each B-type connector includes a second pair of claws that extend from the at least one connector edge, with each claw of the second pair of claws including a said indentation in the side of the claw of the second pair of claws that faces the other claw of the second pair of claws.

36. An interlockable element according to Claim 35, wherein the distance between the outer edges of the protrusions of the first pair of claws is larger than the opening between the second pair of claws.

37. An interlockable element according to Claim 35, wherein the material from which the claws of the first pair and the claws of the second pair of claws are made is slightly flexible so that the pair of protrusions can be forced into the pair of indentations to effect a releasable interlocking engagement between an A-type connector and a B-type connector.

38. An interlockable element according to Claim 1, wherein the protrusion of the A-type connector of the first connector pair and the protrusion of the A-type connector of the second connector pair face in opposite directions.

39. An interlockable element according to Claim 38, wherein the indentation of the B-type connector paired with a said A-type connector faces in the same direction as the protrusion of the paired said A-type connector.

40. An interlockable element according to Claim 1, wherein the at least one connector edge further has associated therewith a third A-type and B-type connector pair disposed about the first axis of rotation and a fourth A-type and B-type connector pair disposed about the second axis of rotation; and
wherein for said third and fourth connector pairs, each A-type connector includes a protrusion and each B-type connector includes an indentation.

41. An interlockable element according to Claim 40, wherein the protrusion of the A-type connector of the first connector pair and the protrusion of the A-type connector of the second connector pair face in opposite directions.

42. An interlockable element according to Claim 41, wherein the protrusion of the A-type connector of the first connector pair and the protrusion of the A-type connector of the third connector pair face in opposite directions.

UNITED STATES PATENT AND TRADEMARK OFFICE
CERTIFICATE OF CORRECTION

PATENT NO. : 6,925,770 B2
DATED : August 9, 2005
INVENTOR(S) : Jens Ole Sorensen et al.

It is certified that error appears in the above-identified patent and that said Letters Patent is hereby corrected as shown below:

Column 18 (cont'd),

43. An interlockable element according to Claim 41, wherein the protrusion of the A-type connector of the first connector pair and the protrusion of the A-type connector of the third connector pair face in the same direction.

Signed and Sealed this

Seventh Day of February, 2006

JON W. DUDAS
*Director of the United States Patent and Trademark Office*